US010635610B1

(12) United States Patent
Calder et al.

(10) Patent No.: US 10,635,610 B1
(45) Date of Patent: Apr. 28, 2020

(54) SYSTEM AND METHOD FOR SERIAL INTERFACE MEMORY USING SWITCHED ARCHITECTURE

(71) Applicant: Toshiba Memory Corporation, Tokyo (JP)

(72) Inventors: Gary James Calder, Eastleigh (GB); Benjamin James Kerr, Overstone (GB); Philip Rose, Oxfordshire (GB)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 16/353,668

(22) Filed: Mar. 14, 2019

(51) Int. Cl.
*G06F 13/16* (2006.01)
*G06F 13/42* (2006.01)
*H04L 12/741* (2013.01)
*G06F 13/40* (2006.01)

(52) U.S. Cl.
CPC ...... *G06F 13/1668* (2013.01); *G06F 13/4022* (2013.01); *G06F 13/4204* (2013.01); *G06F 13/4282* (2013.01); *H04L 45/74* (2013.01); *G06F 2213/0002* (2013.01)

(58) Field of Classification Search
CPC .. G06F 12/06; G06F 12/0623; G06F 13/1668; G06F 13/1673; G06F 13/1684; G06F 13/4022; G06F 13/4282
See application file for complete search history.

(56) References Cited

U.S. PATENT DOCUMENTS

| | | | |
|---|---|---|---|
| 9,846,661 B2* | 12/2017 | Margalit | G06F 13/4022 |
| 2011/0085367 A1* | 4/2011 | Feldman | G11C 7/1012 365/63 |
| 2011/0283043 A1* | 11/2011 | Schuette | G06F 3/0626 711/5 |
| 2012/0079352 A1* | 3/2012 | Frost | G06F 11/1008 714/767 |
| 2018/0074757 A1* | 3/2018 | Yamaguchi | G06F 3/0659 |
| 2019/0065418 A1* | 2/2019 | Steinmacher-Burow | G06F 13/362 |
| 2019/0121756 A1* | 4/2019 | Yang | G06F 13/1668 |

* cited by examiner

*Primary Examiner* — Glenn A. Auve
(74) *Attorney, Agent, or Firm* — Foley & Lardner LLP

(57) ABSTRACT

A memory system for storing and retrieving data may include a controller, a first switch, a second switch connected to the first switch via an interconnecting bus, and a plurality of memory devices. The controller may have a first serial interface. The first switch may have one or more serial interfaces and one or more memory ports. The first serial interface of the controller may be communicatively connected to a first serial interface of the one or more serial interfaces of the first switch via a first serial bus. Each of the one or more memory ports of the first switch may be communicatively connected to a subset of the plurality of memory devices via a memory bus. The first switch may transfer data between the controller and the subsets of the plurality of memory devices via the one or more memory ports.

20 Claims, 12 Drawing Sheets

SYSTEM AND METHOD FOR SERIAL INTERFACE MEMORY USING SWITCHED ARCHITECTURE

TECHNICAL FIELD

Embodiments described herein relate generally to a system and method for controlling an array of memory devices using a switched structure, more particularly to a memory system including a memory controller to control an array of memory devices using multi-channel serial interfaces and a switched architecture including a layer of interconnected switching devices.

BACKGROUND

Currently multiple channel memory controllers are limited to having each channel controller interfacing with a single set of memory dies (or a single set of memory banks). Commands and data for those dies may only be transferred through a single channel controller. Improvement in such a data transferring approach remains desired.

SUMMARY

Embodiments of the present disclosure relate to a memory system including a memory controller using multi-channel serial interfaces, particularly to a memory system including a memory controller to control an array of memory devices using multi-channel serial interfaces and a switched architecture including a layer of interconnected switching devices so as to avoid memory bus congestion and contention.

According to certain aspects, embodiments provide a memory system for storing and retrieving data, including a controller, a first switch, and a plurality of memory devices. The controller may have a first serial interface. The first switch may have one or more serial interfaces and one or more memory ports. The first serial interface of the controller may be communicatively connected to a first serial interface of the one or more serial interfaces of the first switch via a first serial bus. Each of the one or more memory ports of the first switch may be communicatively connected to a subset of the plurality of memory devices via a memory bus. The first switch may be configured to transfer data between the controller and the subsets of the plurality of memory devices via the one or more memory ports.

According to other aspects, embodiments provide a method for storing and retrieving data in a memory system including a plurality of memory devices, a controller, a first switch and a second switch may. According to the method, a memory port may be determined among one or more memory ports of the first switch and one or more memory ports of the second switch. Data may be transferred between the controller and subsets of the plurality of memory devices via the determined memory port.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

According to certain aspects, embodiments in the present disclosure relate to techniques for controlling an array of memory devices using a switched structure, more particularly to a memory system including a memory controller to control an array of memory devices using multi-channel serial interfaces and a switched architecture including a layer of interconnected switching devices, so as to avoid memory bus congestion and contention.

Figure 1:
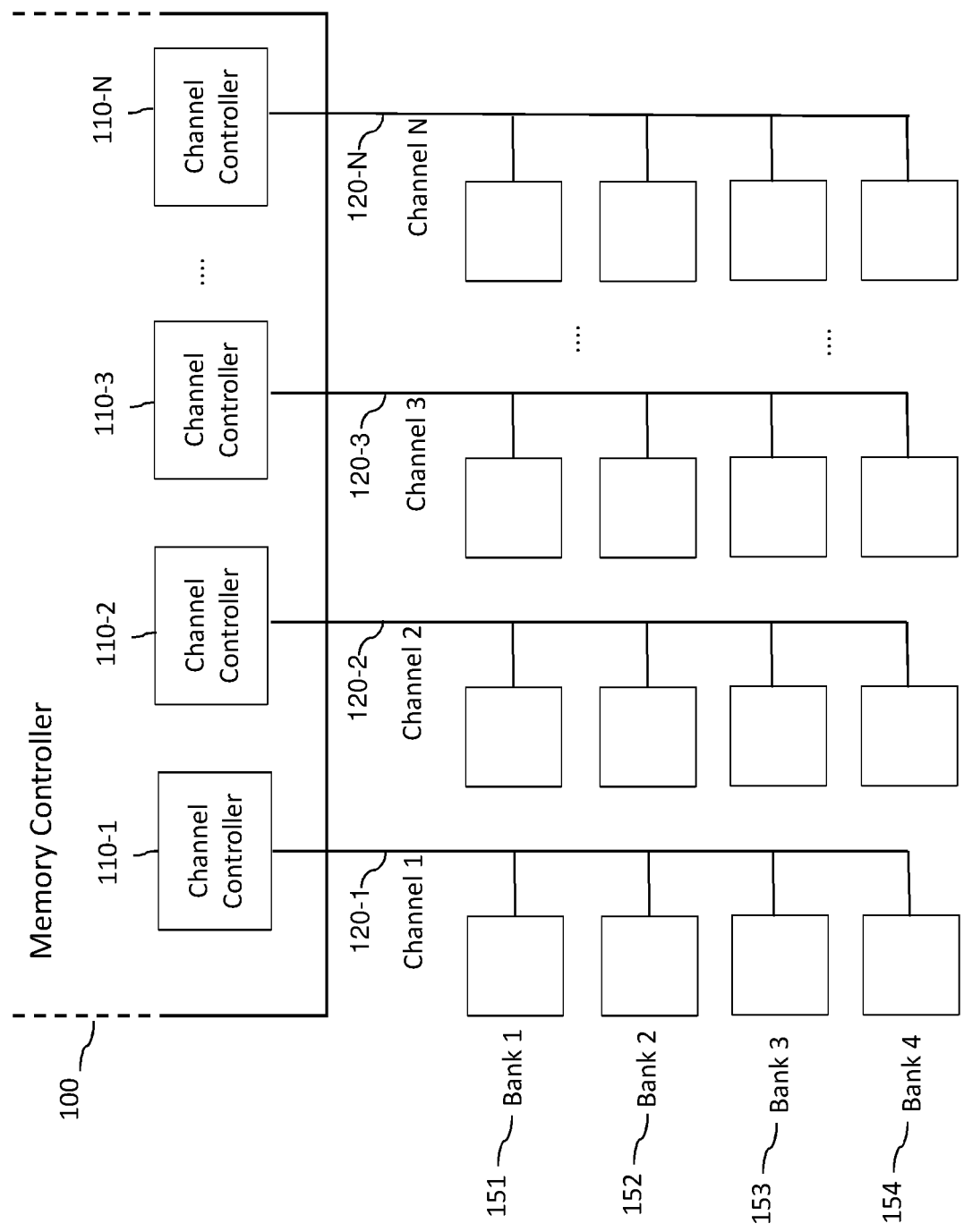
FIG. 1 is a block diagram illustrating an example of a conventional memory system.

Communication between a non-volatile (NV) memory controller and NV memory devices traditionally is performed on a multi-drop parallel communication bus, suited to the type of NV memory. One example of a parallel communication bus standard for NV memory is ONFI (Open NAND Flash Interface), which defines the data interface, signals, terminations, timing parameters and commands/responses on the bus. NV memory dies are arranged in sets of dies (or banks) on a parallel bus, with multiple separate buses (or channels) driven from the memory controller. Each bus/channel is therefore dedicated to a single set of dies (or banks), with a dedicated memory back end controller (or channel controller) for each channel. For example, FIG. 1 shows a memory controller 100 including a plurality of channel controllers (110-1, 110-2, ..., 110-N), each connected to a plurality of banks (e.g., a set of four memory banks) using a single-channel serial interface. Each channel controller drives a corresponding one of buses or channels (e.g., channel 1 (120-1), channel 2 (120-2), channel 3 (120-3), channel 4 (120-4) in FIG. 1) which is dedicated to a single set of banks. For example, channel 1 is dedicated to a set of Bank 1 (151), Bank 2 (152), Bank 3 (153), and Bank 4 (154).

The subject of U.S. patent application Ser. No. 16/054,755, titled "Serial Interface for Semiconductor Package," the contents of which are incorporated herein by reference in their entirety, is a serial interface solution. This concerns using a high speed signaling protocol using differential data signaling (with no separate clock signals) which connects to the NV memory devices. In some embodiments, a bridge device can be defined which interfaces between the high speed differential data signaling and conventional parallel bus type NV memory devices.

Figure 2:
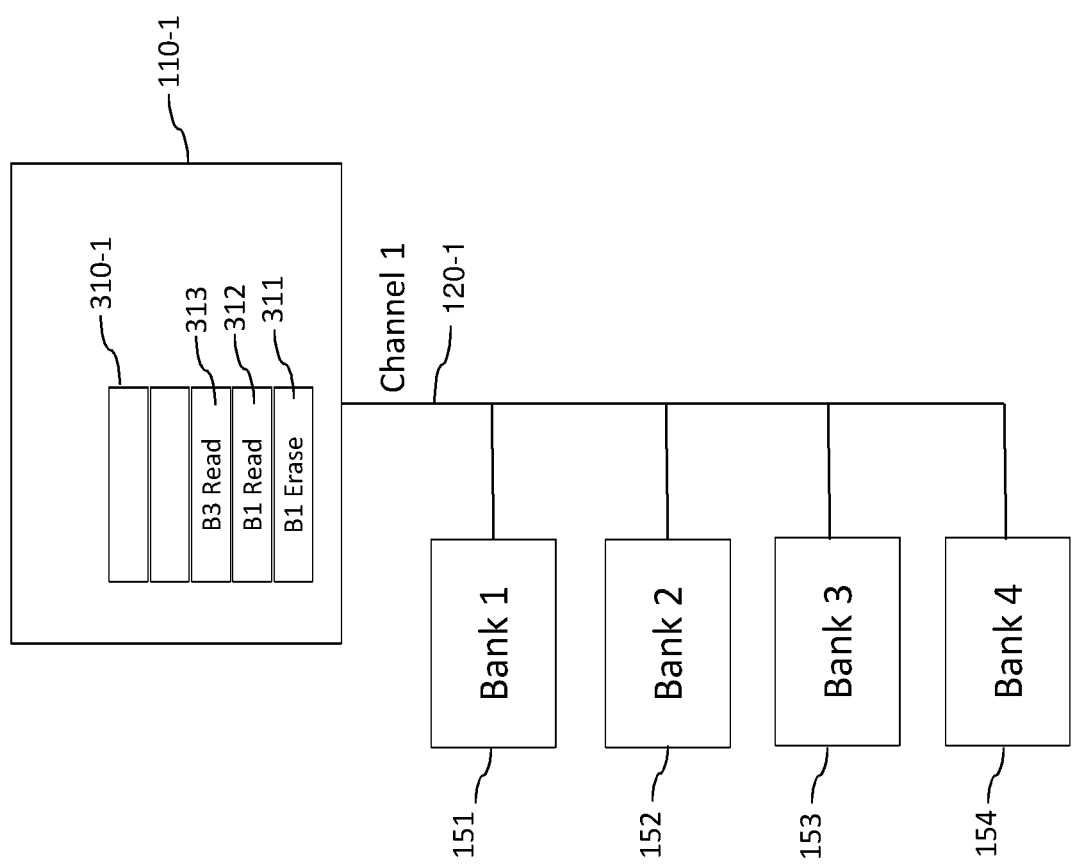
FIG. 2 is a block diagram illustrating an example operation of a conventional memory system.

In a memory system in which memory devices in a two-dimensional (2D) array are arranged as multiple dies (or banks) in columns accessed by a single memory bus (channel) per column, scheduling of commands to the memory devices may suffer from a queued command blocking or stalling in a queue which is full of commands, due to limited shared channel resources. Commands may be waiting for completion of a long running command (e.g., erase or program commands) on a particular die, whereas other commands could be usefully sent to other dies on the same channel. For example, FIG. 2 shows a queue 310-1 in the channel controller 110-1 which stores three commands—B1 Erase 311 (to erase a memory block on Bank 1), B1 Read 312 (to read data from a memory page of Bank 1), and B3 Read 313 (to read data from a memory page Bank 3) to be transmitted in this order. Because B1 Erase is a long running command and all the commands in the queue share a dedicated channel (channel 1), B1 Read must wait until B1 Erase completes (e.g., tens of milliseconds). Moreover, next command B3 Read must join and wait. This causes the B1 Read 312 and B3 Read 313 commands to suffer increased I/O latency due to having to wait behind B1 Erase.

To solve this problem among others, in some embodiments, the conventional multi-drop parallel bus architecture of NV memory controllers to NV memory devices may be replaced with a switched serial architecture. In some embodiments, a high speed serial switch may be interposed between serial channel interfaces of a memory controller and an array of memory devices. In some embodiments, a plurality of serial switches can be arranged such that command and data transfers between the memory controller and any memory device (or die or bank) of the array can be performed from or to any of the serial channel interfaces of the memory controller. With this configuration, channel queue blocking and memory bus congestion and contention can be avoided and/or alleviated. In some embodiments, data may be transferred over the serial channel interface in packets. In some embodiments, a time division multiplex (TDM) method may be employed to a serial channel interface where the bandwidth of the serial channel may be divided and shared by allowing access to the serial channel according to fixed timeslots. In one embodiment, timeslots may be allocated according to input/output commands belonging to a group known as an input/output determinism (IOD) set. An IOD set refer to groups of input/output commands which have a dedicated share of the overall memory bandwidth. In conventional systems, this may be provided by allocated a fixed number of the available parallel memory channels, which has the disadvantage that only a fraction of the overall memory bandwidth is available to the IOD set. In one embodiment, an IOD set can retain the full parallel transfer bandwidth using all available channels but which can share the bus by using separate, pre-allocated timeslots and avoid a so-called 'noisy neighbor' set to set interference. The 'noisy neighbor' problem may occur when a neighbor node monopolizes memory channel bandwidth, memory I/O, CPU and other resources, and it can negatively affect other users' performance. The noisy neighbor effect causes other nodes and applications that share the infrastructure to suffer from uneven I/O performance, such as increased latency of read commands due to queueing time behind slower commands such as erase and program commands.

In some embodiments, a switching layer may be added between the memory controller and the memory dies (or banks), with a plurality of interconnected switching devices (or switches). In some embodiments, the interconnected switching devices may be merged with a bridge device for interfacing to legacy parallel bus memory dies. In some embodiments, interconnected switching devices may be interposed between the memory controller and the memory dies.

Figure 3:
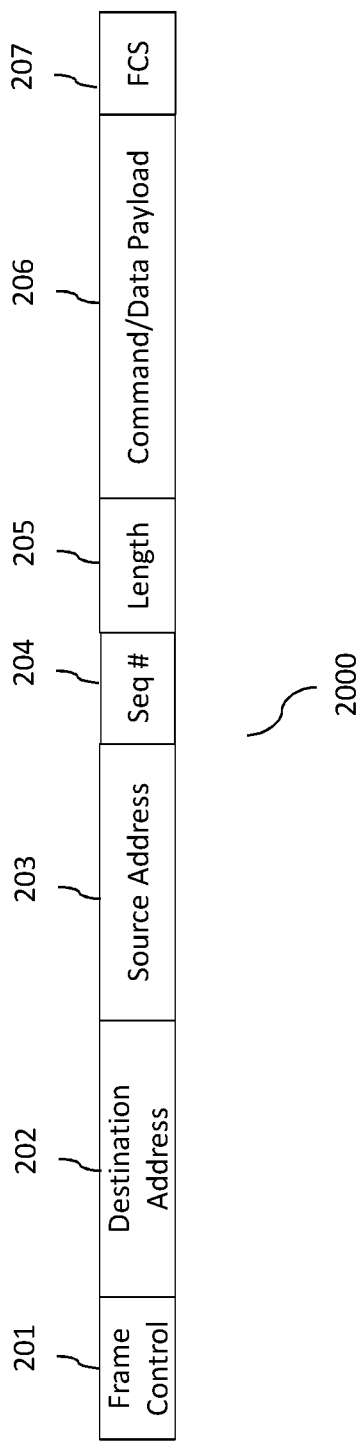
FIG. 3 is a block diagram illustrating an example format of Die Access Control (DAC) packet according to some embodiments.

In some embodiments, communication between a memory controller and memory devices may be performed using control packets, e.g., Die Access Control (DAC) packets. FIG. 3 shows a format of a DAC packet including a plurality fields—frame control 201, destination DAC address 202, source DAC address 203, sequence number 204, length 205, payload (command or data) 206, and frame check sequence (FCS) 207. The DAC packet can be switched (across the layer of a plurality of switches) to the 'downstream' physical link containing the die with the destination DAC address. If the die with the destination DAC address is not attached to a switch, the packet can be switched across the layer of switches to the correct switch so that the packet is forwarded to the correct downstream physical link. Thus, instead of having a dedicated 1:n relationship between a (parallel bus) channel controller and n memory dies, a memory controller with m serial memory channels can have an m:n relationship. In some embodiments, a switch may incorporate a bridging function which can decode and translate the DAC protocol packet to any parallel or serial bus memory protocol. Legacy parallel bus memory devices can thereby be attached to the switch and receive commands from, or send data to, a serial bus memory controller.

In some embodiments, a link layer protocol may be defined which uses source and destination DAC addresses (see FIG. 3) in a header of a DAC packet which encapsulates memory commands sent to, or data/status received from, a memory die. Commands in DAC packets may be sent from a channel controller to a switching device.

In some embodiments, switching devices which are responsive to a defined DAC data link protocol may be arranged as an intermediate switching layer between memory buses of a serial bus memory controller and an array of memory devices. In some embodiments, to attach legacy parallel bus memory devices, a bridging function may be incorporated into a switching device which decodes or encodes DAC packets and sends or receives parallel memory bus commands (or parallel memory bus data) to or from the memory devices.

While designed primarily for NAND flash memory devices, embodiments of the present disclosure are not limited thereto and may be applied to any memory technology.

Some advantages of the systems and methods described in the present disclosure are as follows. First, memory bus congestion and contention can be avoided by enabling a switched route to/from any die from/to any channel controller. In some embodiments, a switched route can be enabled from to/from any die from/to any queue of a memory controller.

Second, by using a TDM bus connection between a channel controller and a switching device with dedicated timeslots per destination (e.g., per memory die, per memory bank, per memory device) providing a dedicated bus bandwidth to each destination, applications requiring input/output determinism (IOD) sets can configure multiple sets to share a single serial channel controller without interference between accesses to different sets. Two IOD sets, for example, could be defined as one using devices from Bank 0 of each channel, the other using devices from Bank 1, thereby gaining a full parallel I/O bandwidth by using all available channels for the set while still being immune from the 'noisy neighbor' problem.

Third, a serial to serial bridge function in a switching device can interchange commands and data between a serial TDM bus to the memory controller and a ready/busy access control type serial bus of a memory device.

Fourth, by using a communication protocol using DAC packets, routing of individual packets of data between a channel controller and a memory die can be enabled using source and destination addresses contained within the DAC packets, where individual packets of an I/O communication may take different routes according to the availability of channel bandwidth or switching resources.

Figure 4:
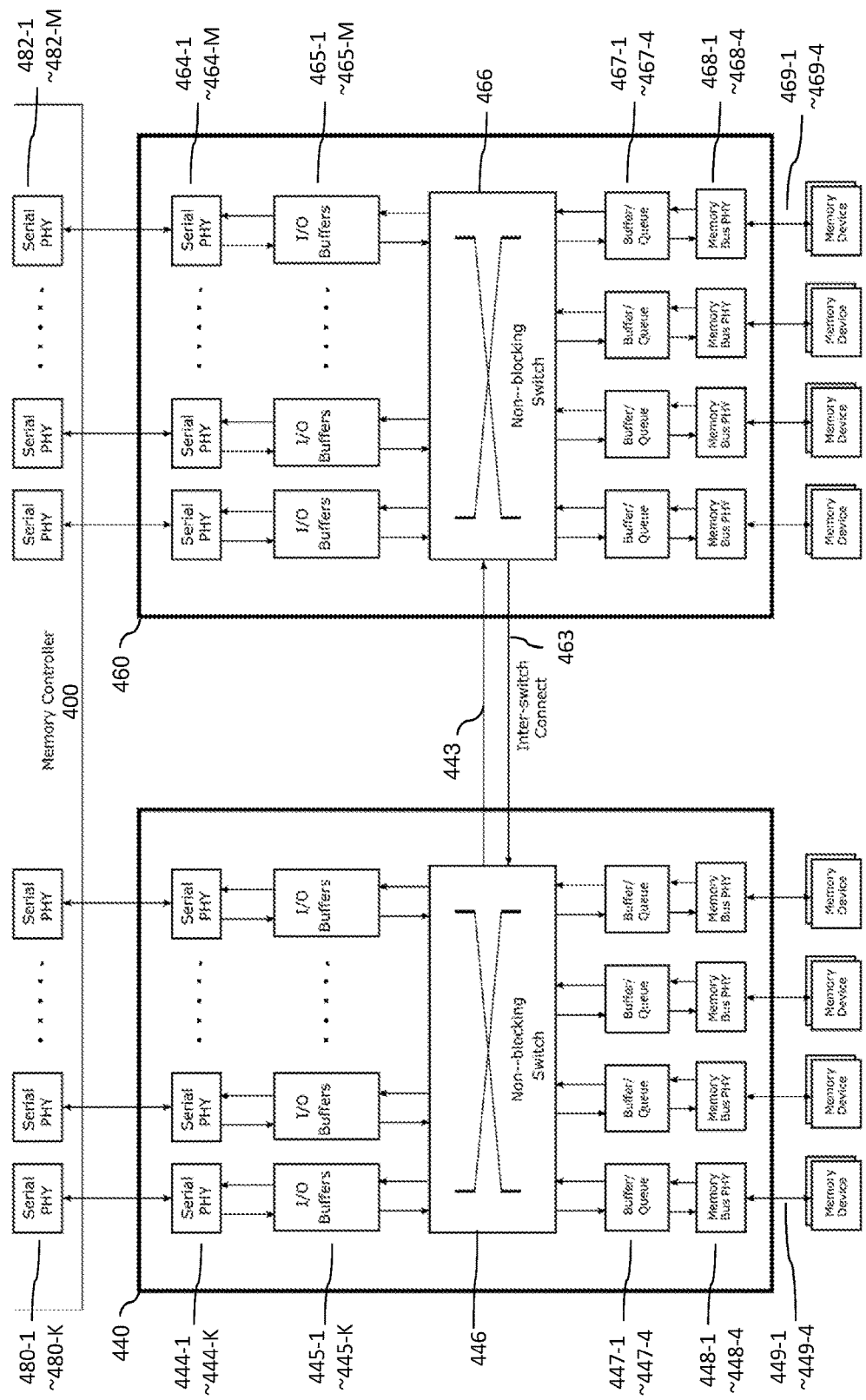
FIG. 4 is a block diagram illustrating an example memory system using a switched architecture according to some embodiments.

FIG. 4 is a block diagram illustrating an example memory system 4000 using a switched architecture according to some embodiments, which can perform any of the methods described in the present disclosure.

Referring to FIG. 4, the memory system 4000 may include a memory controller (or controller) 400 and a plurality of switches (or switching devices) including a switch 440 and a switch 460.

The memory controller 400 may be an NV memory controller. The memory controller 400 may include a plurality of serial interfaces including K number of serial interfaces 480-1 to 480-K and M number of serial interfaces 482-1 to 482-M. In some embodiments, some of the serial interfaces of the memory controller may be coupled to respective queues (e.g., queues 515-1, . . . 515-N in FIG. 5) so that memory commands in a queue can be sent to its corresponding serial interface of the memory controller. Serial interfaces of the memory controller may be serial interfaces in PHY layer (layer 1). In some embodiments, serial interfaces of the memory controller may be serial interfaces in Data link layer or upper layers.

Each of the switches 440 and 460 may include a plurality of serial interfaces. For example, the switch 440 may include K number of serial interfaces 444-1 to 444-K respectively connected to the serial interfaces 480-1 to 480-K of the memory controller 400. Similarly, the switch 460 may include M number of serial interfaces 464-1 to 464-M respectively connected to the serial interfaces 482-1 to 482-M of the memory controller 400. Serial interfaces of the switch may be serial interfaces in physical layer (PHY). In some embodiments, serial interfaces of the switch may be serial interfaces in Data link layer or upper layers. In some embodiments, serial interfaces of the switch may be serial full duplex interfaces in physical layer (PHY).

In some embodiments, each of the switches 440 and 460 may include a plurality of input/output (I/O) buffers. For example, the switch 440 may include K number of I/O buffers 445-1 to 445-K respectively coupled to the serial interfaces 444-1 to 444-K. Similarly, the switch 460 may include M number of I/O buffers 465-1 to 465-M respectively coupled to the serial interfaces 464-1 to 464-M.

Each of the switches 440 and 460 may include a plurality of (memory) ports. For example, the switch 440 may include four ports 448-1 to 444-4 respectively connected to memory buses 449-1 to 449-4. Each memory bus may be connected to a set of memory devices (or a set of memory banks or a set of memory dies). Similarly, the switch 460 may include four ports 468-1 to 468-4 respectively connected to memory buses 469-1 to 469-4. Ports of the switch may be interfaces to memory buses in PHY layer (layer 1). In some embodiments, ports of the switch may be interfaces in Data link layer or upper layers. Each port of the switch may be connected to a parallel (memory) bus on which parallel bus-type memory devices can transfer data or commands. In some embodiments, each port of the switch may be connected to a serial (memory) bus on which serial bus-type memory devices can transfer data or commands. In some embodiments, each port of the switch may be connected to one of a parallel bus or a serial bus.

In some embodiments, each of the switches 440 and 460 may include a plurality of memory-side buffers coupled to respective ports. For example, the switch 440 may include four memory-side buffers 447-1 to 447-4 respectively coupled to the ports 448-1 to 448-4. Similarly, the switch 460 may include four memory-side buffers 467-1 to 467-4 respectively coupled to the ports 468-1 to 468-4. In some embodiments, memory-side buffers may include respective queues so that data or commands in the queue can be transferred to a set of memory devices in the order in which the data or commands are stored in the queue. Similarly, data or command can be stored into a queue of the memory-side buffer in the order in which the data or command are transferred from a set of memory devices.

Each of the switches 440 and 460 may include one or more non-blocking switch units that can connect between a plurality of serial interfaces and a plurality of ports. In other words, the non-blocking switch unit(s) of each of the switches 440 and 460 can connect between any of the plurality of serial interfaces of the switch and any of the plurality of ports of the switch so that data or commands can be transferred between (1) any of the serial interfaces of the memory controller connected to the serial ports of the switch and (2) any of the memory buses connected to the ports of the switch. For example, the switch 440 may include a non-blocking switch unit 446 connecting between K number of serial interfaces 444-1 to 444-K and four ports 448-1 to 448-4. Similarly, the switch 460 may include a non-blocking switch unit 466 connecting between M number of serial interfaces 464-1 to 464-M and four ports 468-1 to 468-4.

In some embodiments, the switch (e.g., 440 or 460 in FIG. 4) or the non-blocking switch unit thereof may incorporate a bridging function which can decode and translate a DAC protocol packet to any parallel or serial bus memory protocol and vice-versa. The DAC packet can be switched (across the layer of a plurality of switches) to the 'downstream' physical link containing the die with the destination DAC address. In some embodiments, based on a DAC packet received from a memory controller, the switch can determine a port among the plurality of ports of the switch and switch the DAC packet to the determined port. Conversely, based on a DAC packet received from a memory bus (connected a port of the switch), the switch can determine a serial interface among the plurality of serial interfaces of the switch and switch the DAC packet to the determined serial interface. In some embodiments the memory-side buffers may perform the bridging function. In some embodiments where the memory bus is a parallel memory bus, the bridging may incorporate serial to parallel and parallel to serial converters which can decode and translate DAC protocol packets to a parallel memory bus protocol and vice-versa.

In some embodiments, the non-blocking switch unit of a switch (e.g., 440 or 460 in FIG. 4) may be connected to the non-blocking switch unit of another switch via an inter-switch connect (or an interconnecting bus). For example, the non-blocking switch unit 446 of the switch 440 may be connected to the non-blocking switch unit 466 of the switch 460 via a first interconnecting bus 443 and a second interconnecting bus 463. An interconnecting bus may be a half-duplex link or a full-duplex link. For example, the two interconnecting buses 443 and 463 may form a full-duplex link between the non-blocking switch unit 446 and the non-blocking switch unit 466 so that the non-blocking switch units can switch a packet to each other simultaneously.

In some embodiments, using the inter connecting bus, the non-blocking switch unit 446 of the switch 440 can connect not only between any of the plurality of serial interfaces 441-1 to 441-K of the switch 440 and any of the plurality of ports 448-1 to 448-4 of the switch 440 but also between any of the plurality of serial interfaces 441-1 to 441-K of the switch 440 and any of the plurality of ports 468-1 to 468-4 of the switch 460. Similarly, using the inter connecting bus, the non-blocking switch unit 466 of the switch 460 can connect not only between any of the plurality of serial interfaces 461-1 to 461-M of the switch 460 and any of the plurality of ports 468-1 to 468-4 of the switch 460 but also between any of the plurality of serial interfaces 461-1 to 461-M of the switch 460 and any of the plurality of ports 448-1 to 448-4 of the switch 440. That is, data or commands can be transferred between (1) any of the serial interfaces of the memory controller connected to the serial ports of a first switch and (2) any of the memory buses connected to the ports of the first switch and the memory busses connected to the ports of a second switch that is connected to the first switch via an interconnecting bus. In some embodiments, based on a DAC packet received from a memory controller, a first switch can determine a port among the plurality of ports of the first switch and the plurality of ports of a second switch connected to the first switch via an interconnecting bus, and switch the DAC packet to the determined port. Conversely, based on a DAC packet received from a memory bus (connected a port of a first switch), the first switch can determine a serial interface among the plurality of serial interfaces of the first switch and the plurality of serial interfaces of a second switch connected to the first switch via an interconnecting bus, and switch the DAC packet to the determined serial interface.

Using the switched architecture illustrated in FIG. 4, a memory controller can transfer data via a serial interface to any memory device on any (memory) port. For example, using the switch 460, the memory controller can transfer data via a serial interface (e.g., 482-1) to any memory device (connected via a memory bus) on any memory port among the ports 448-1 to 448-4 and the ports 468-1 to 468-4. In some embodiments, the memory controller can transfer data via any serial interface to any device on any port. For example, the memory controller can transfer data via any serial interface among the serial interfaces 480-1 to 480-K and the serial interfaces 482-1 to 482-M to any memory device (connected via a memory bus) on any memory port among the ports 448-1 to 448-4 and the ports 460-1 to 469-4. In some embodiments, the memory controller can transfer data to any device on any port using any switch. For example, the memory controller can transfer data to any memory device (connected via a memory bus) on any memory port among the ports 448-1 to 448-4 and the ports 460-1 to 469-4 using either the switch 440 or the switch 460 or both.

In some embodiments, the timing of the inputs to a switch (e.g., 440) and outputs from the switch may be independent due to buffering and queuing (e.g., by the I/O buffers 445-1 to 445-K and the memory-side buffers 447-1 to 447-4. For example, incoming packets from the controller (e.g., the memory controller 400) may be buffered in the I/O buffers 445-1 to 445-K, and outgoing commands/data to the memory devices may be queued in the memory-side buffers/queues 447-1 to 447-4.

Figure 5:
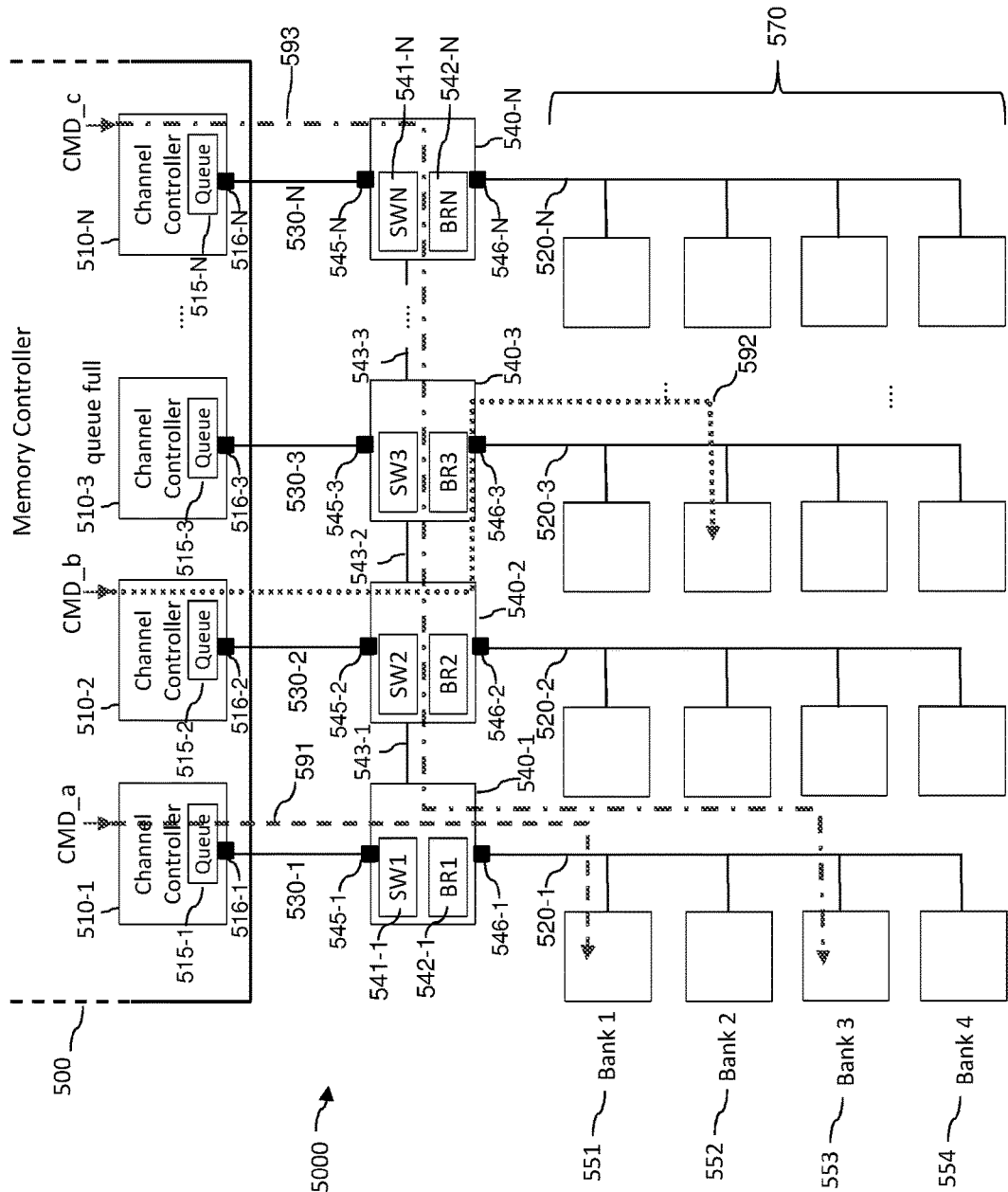
FIG. 5 is a block diagram illustrating an example memory system including parallel memory devices using a switched architecture according to some embodiments.

FIG. 5 is a block diagram illustrating an example memory system 5000 including parallel memory devices using a switched architecture according to some embodiments.

The memory system 5000 includes a memory controller 500 and a plurality of switches 540-1 to 540-N. In the memory controller 500, a plurality of channel controllers 510-1 to 510-N may be respectively connected to the plurality of switches 540-1 to 540-N. Each channel controller (each of 510-1 to 510-N) may include a serial interface (each of 516-1 to 516-N) which has similar configuration to that of each serial interface 480-1 to 480-K in FIG. 4. Each channel controller (each of 510-1 to 510-N) may include a queue (each of 515-1 to 515-N) which can store data or commands to be transmitted to a switch (one of the switches 540-1 to 540-N) in the order in which the data or commands are stored in the queue.

Each of the plurality of switches 540-1 to 540-N may have similar configuration to that of the switch 440 or 460 in FIG. 4. Each switch (each of 540-1 to 540-N) may include a serial interface (each of 545-1 to 545-N) and a memory port (each of 546-1 to 546-N). For example, the serial interfaces 545-1 to 545-N may have similar configuration to that of the serial interfaces 444-1 to 444-K in FIG. 4. The memory ports 546-1 to 546-N may have similar configuration to that of the memory ports 448-1 to 448-4 in FIG. 4. Each switch (540-1 to 540-N) may include a switching device (SW1 (541-1) to SWN (541-N)) which has similar configuration to that of a non-blocking switch unit 446 in FIG. 4. Each switch (540-1 to 540-N) may be configured to perform a bridging function (BR1 (542-1) to BRN (542-N)) which can decode and translate a DAC protocol packet to any parallel or serial bus memory protocol and vice-versa. Legacy parallel bus memory devices can thereby be attached to the switch and receive commands from, or send data to, a serial bus memory controller. Adjacent switches of the switches 540-1 to 540-N may be connected with each other via an interconnecting bus (543-1, 543-2, 543-3, . . . , etc.) similar to the interconnecting bus 443 or 463 in FIG. 4. For example, the switch 540-1 may be connected to the switch 540-2 via an interconnecting bus 543-1. Each interconnecting bus (543-1, 543-2, 543-3, . . . ) may be a half-duplex link or a full-duplex link. For example, the interconnecting bus 543-1 may form a full-duplex link between the switch 540-1 and the switch 540-2 so that the two switches can switch a packet to each other simultaneously.

The serial interfaces 545-1 to 545-N of the switches may be connected to the serial interfaces 516-1 to 516-N of the memory controller 500 via a plurality of serial buses 530-1 to 530-N, respectively. Each serial bus may be a half-duplex link or a full-duplex link. For example, in FIG. 5, each serial bus 530-1 to 530-N may form a full-duplex link between the corresponding channel controller and switch so that the channel controller and switch can transfer data or commands to each other simultaneously.

Referring to FIG. 5, in some embodiments, the memory ports 546-1 to 546-N may be respectively connected to a plurality of parallel memory buses 520-1 to 520-N on which a plurality of parallel memory bus-type memory devices 570 can transfer data and commands. In some embodiments, the parallel memory bus-type memory devices 570 may be arranged in multiple banks (e.g., Bank 1 (551), Bank 2 (552), Bank 3 (553), Bank 4 (554). Using an inter-connected switching architecture, any of the switches 540-1 to 540-N can receive data or commands from a channel controller via a (single) serial bus and transfer them to any of the memory devices 570 via a parallel memory bus. In other words, each switch can allow 'fan out' of single serial port to multiple memory buses, each of which is shared by multiple memory devices. For example, as shown in the command flow scenario 591 in FIG. 5, the memory controller may store a command CMD_a in the queue 515-1 to be transferred to the switch 540-1 via a single serial bus 530-1, and then the switch 540-1 may transfer CMD_a to a memory device in Bank 1 via a parallel bus 520-1. As shown in the command flow scenario 592 in FIG. 5, a command CMD_b may be stored in the queue 515-2, transferred to the switch 540-2 via a single serial bus 530-2, and further transferred to the switch 540-3 via an interconnecting link 543-2 and then transferred to a memory device in Bank 2 via a parallel bus 520-3. As shown in the command flow scenario 593 in FIG. 5, a command CMD_c may be stored in the queue 515-N, transferred to the switch 540-N via a single serial bus 530-N. CMD_c may be then transferred to the switch 540-(N−1), the switch 540-(N−2), . . . , the switch 540-1 in this order via the interconnecting link 543-(N−1), the interconnecting links 543-(N−2), . . . , the interconnecting link 543-1, respectively, and then transferred to a memory device in Bank 3 via a parallel bus 520-1.

Figure 6:
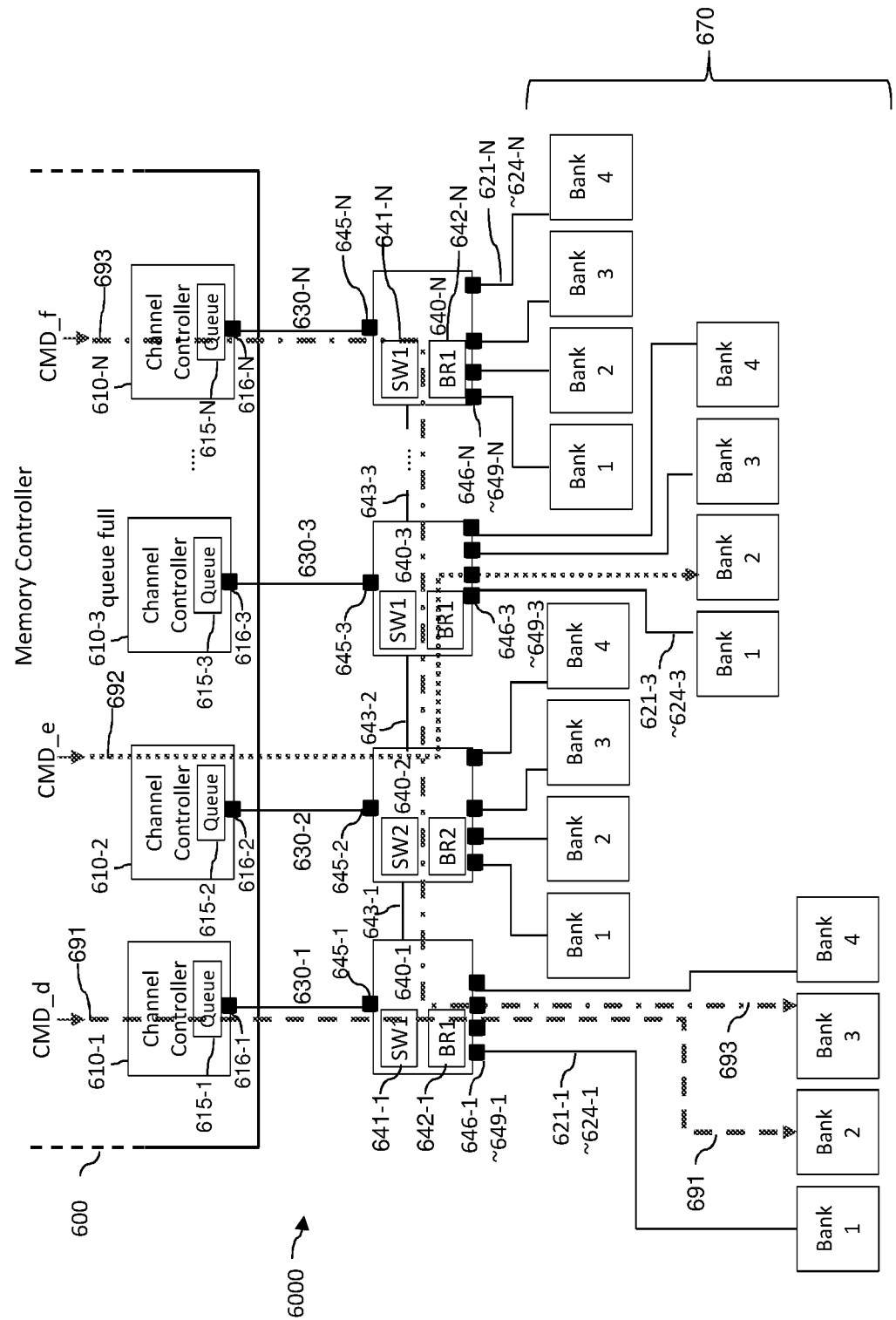
FIG. 6 is a block diagram illustrating an example memory system including serial bus memory devices using a switched architecture according to some embodiments.

FIG. 6 is a block diagram illustrating an example memory system 6000 including serial bus memory devices using a switched architecture according to some embodiments.

The memory system 6000 includes a memory controller 600 and a plurality of switches 640-1 to 640-N. In the memory controller 600, a plurality of channel controllers 610-1 to 610-N may be respectively connected to the plurality of switches 640-1 to 640-N. Each channel controller (each of 610-1 to 610-N) may include a serial interface (each of 616-1 to 616-N) which has similar configuration to that of each serial interface 480-1 to 480-K in FIG. 4. Each channel controller (each of 610-1 to 610-N) may include a queue (each of 615-1 to 615-N) which can store data or commands to be transmitted to a switch (one of the switches 640-1 to 640-N) in the order in which the data or commands are stored in the queue.

Each of the plurality of switches 640-1 to 640-N may have similar configuration to that of the switch 440 or 460 in FIG. 4. Each switch (each of 640-1 to 640-N) may include a serial interface (each of 645-1 to 645-N) and a plurality of memory ports (each of 646-1-649-1, . . . , 646-N-649-N). For example, the serial interfaces 645-1 to 645-N may have similar configuration to that of the serial interfaces 444-1 to 444-K in FIG. 4. The memory ports 646-1-649-1, . . . , 646-N-649-N may have similar configuration to that of the memory ports 448-1 to 448-4 in FIG. 4. Each switch (640-1 to 640-N) may include a switching device (SW1 (641-1) to SWN (641-N)) which has similar configuration to that of a non-blocking switch unit 446 in FIG. 4. Each switch (640-1 to 640-N) may be configured to perform a bridging function (BR1 (642-1) to BRN (642-N)) which can decode and translate a DAC protocol packet to a serial bus memory protocol and vice versa. Adjacent switches of the switches 640-1 to 640-N may be connected with each other via an interconnecting bus (643-1, 643-2, 643-3, . . . , etc.) similar to the interconnecting bus 443 or 463 in FIG. 4. The serial interfaces 645-1 to 645-N of the switches may be connected to the serial interfaces 616-1 to 616-N of the memory controller 600 via a plurality of serial buses 630-1 to 630-N, respectively. Each serial bus may be a half-duplex link or a full-duplex link. For example, in FIG. 6, each serial bus 630-1 to 630-N may form a full-duplex link between the corresponding channel controller and switch so that the channel controller and switch can transfer data or commands to each other simultaneously.

Referring to FIG. 6, in some embodiments, the memory ports of each switch may be respectively connected to a plurality of serial memory buses. For example, the memory ports 646-1 to 649-1 of the switch 640-1 may be respectively connected to four serial memory buses 621-1-624-1 on which memory devices in Banks 1-4 can transfer data or commands, respectively. Similarly, the memory ports 646-N to 649-N of the switch 640-N may be respectively connected to four serial memory buses 621-N-624-N on which memory devices in Banks 1-4 can transfer data or commands, respectively. In some embodiments, the memory devices in Banks 1-4 may be a plurality of serial memory bus-type memory devices 670. In some embodiments, each of the memory ports of a switch may be connected to an individual bus of a memory device, which may be a parallel memory bus or a serial memory bus, thereby implementing a higher performance configuration. In some embodiments, the memory bus access may be controlled via chip selects. For example, selection of the destination memory device may be performed via separate Chip Enable pins (not shown) so that the data transfer to that device has exclusive access to the bus. When a selection is made such that the controller and a selected memory device have exclusive access to 100% of the bus, the controller or a switch may select memory devices in turn to send commands/data and receive data/status, for example.

Using an inter-connected switching architecture, any of the switches 640-1 to 640-N can receive data or commands from a channel controller via a (single) serial bus and transfer them to any of the memory devices 670 via a serial memory bus. For example, as shown in the command flow scenario 691 in FIG. 6, the memory controller 600 may store a command CMD_d in the queue 615-1 to be transferred to the switch 640-1 via a single serial bus 630-1, and then the switch 640-1 may transfer CMD_d to a memory device in Bank 2 via a serial memory bus 622-1. As shown in the command flow scenario 692 in FIG. 6, a command CMD_e may be stored in the queue 615-2, transferred to the switch 640-2 via a single serial bus 630-2, and further transferred to the switch 640-3 via an interconnecting link 643-2 and then transferred to a memory device in Bank 2 via a serial memory bus 622-3. As shown in the command flow scenario 693 in FIG. 6, a command CMD_f may be stored in the queue 615-N, transferred to the switch 640-N via a single serial bus 630-N. CMD_f may be then transferred to the switch 640-(N−1), the switch 640-(N−2), . . . , the switch 640-1 in this order via the interconnecting link 643-(N−1), the interconnecting links 643-(N−2), . . . , the interconnecting link 643-1, respectively, and then transferred to a memory device in Bank 3 via a serial memory bus 623-1.

Figure 7:
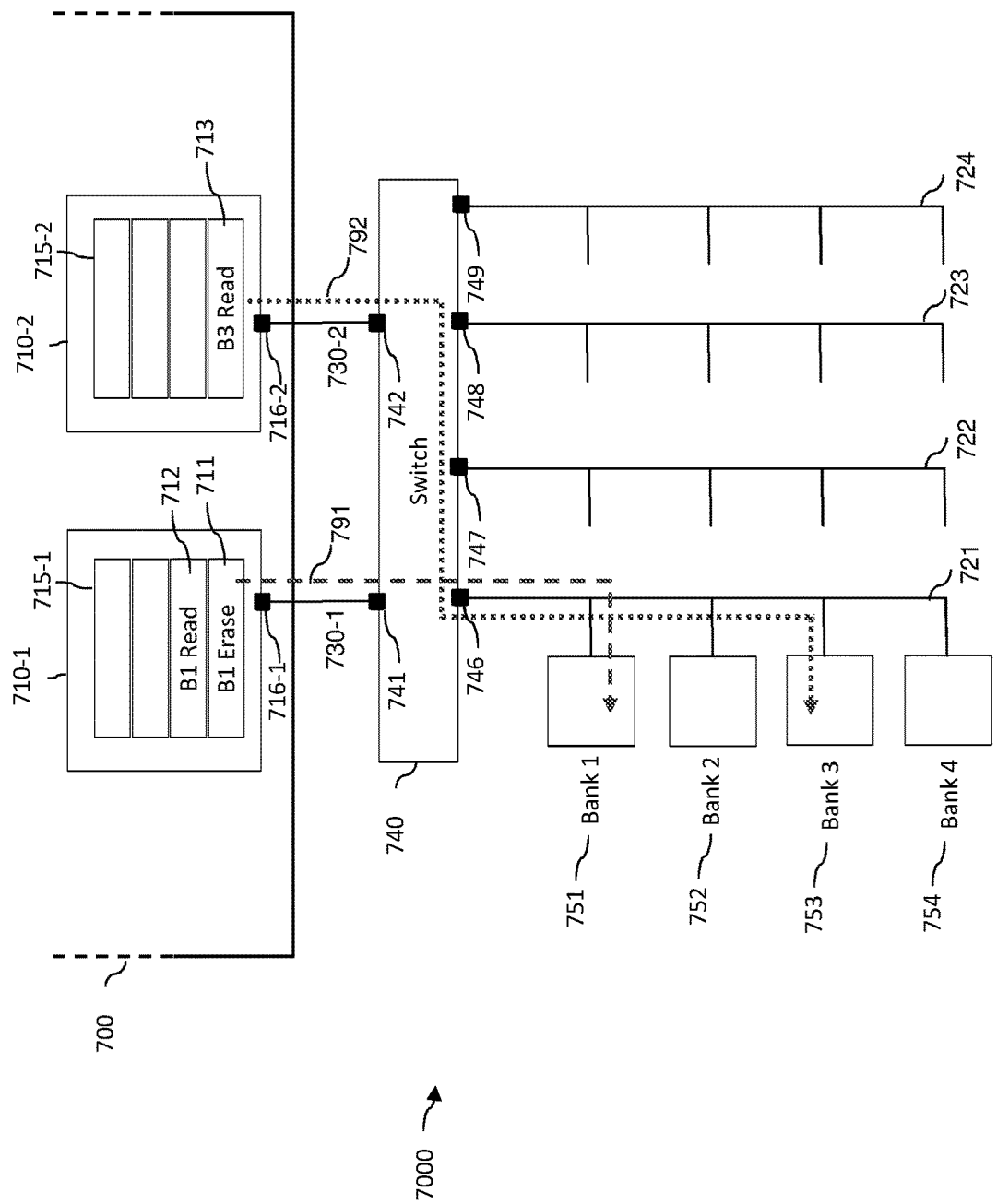
FIG. 7 is a block diagram illustrating an example operation of a memory system using a switched architecture according to some embodiments.

FIG. 7 is a block diagram illustrating an example operation of a memory system 7000 using a switched architecture according to some embodiments.

The memory system 7000 includes a memory controller 700 and a switch 740. In the memory controller 700, both channel controllers 710-1 and 710-2 may be connected to the switch 740. Each channel controller (each of 710-1 and 710-2) may include a serial interface (each of 716-1 and 716-2) which has similar configuration to that of each serial interface 480-1 to 480-K in FIG. 4. Each channel controller (each of 710-1 and 710-2) may include a queue (each of 715-1 and 715-2) which can store data or commands to be transmitted to the switch 740 in the order in which the data or commands are stored in the queue.

The switch 740 may have similar configuration to that of the switch 440 or 460 in FIG. 4. The switch 740 may include two serial interfaces 741 and 742 which have similar configuration to that of the serial interfaces 444-1 to 444-K in FIG. 4, and include four memory ports 746-1 to 749 which have similar configuration to that of the memory ports 448-1 to 448-4 in FIG. 4. The switch 740 may include a switching device which has similar configuration to that of a non-blocking switch unit 446 in FIG. 4. The switch 740 may be configured to perform a bridging function which can decode and translate a DAC protocol packet to any parallel or serial bus memory protocol and vice versa. The serial interfaces 741 and 742 of the switch 740 may be connected to the serial interfaces 716-1 and 716-2 of the memory controller 700 via two serial buses 730-1 and 730-2, respectively. The memory ports 746 to 749 may be respectively connected to four parallel memory buses 721 to 724 on which a plurality of parallel memory bus-type memory devices arranged in Bank 1 (751), Bank 2 (752), Bank 3 (753), Bank 4 (754) can transfer data and commands, respectively.

FIG. 7 shows a scenario similar to that illustrated in FIG. 2, in which there exist three commands B1 Erase 711 (to erase a memory block in Bank 1), B1 Read 712 (to read data in a memory page from Bank 1), and B3 Read 713 (to read data in a memory page from Bank 3) to be transmitted in this order. As shown in FIG. 7, the memory controller 700 may determine that B1 Erase 711 is a long running command and B1 Erase 711 and B1 Read 712 need to access the same memory bank, and store B1 Erase 711 and B1 Read 712 in the queue 715-1 in this order, and store B3 Read 713 in a different queue 715-2. As shown in the command flow scenario 791 in FIG. 7, B1 Erase 711 may then be transferred to the switch 740 via a single serial bus 730-1, and further transferred to a memory device in Bank 1 via a parallel memory bus 721. Now, as shown in the command flow scenario 792 in FIG. 7, without any delay due to a queued command blocking or stalling in a queue, B3 Read 713 may be transferred to the switch 740 via a single serial bus 730-2, and further transferred to a memory device in Bank 3 via a parallel memory bus 721. With this configuration, B3 Read need not wait until B1 Erase completes, thereby avoiding a delay due to a long running command blocking or stalling in a queue (see FIG. 2).

Figure 8:
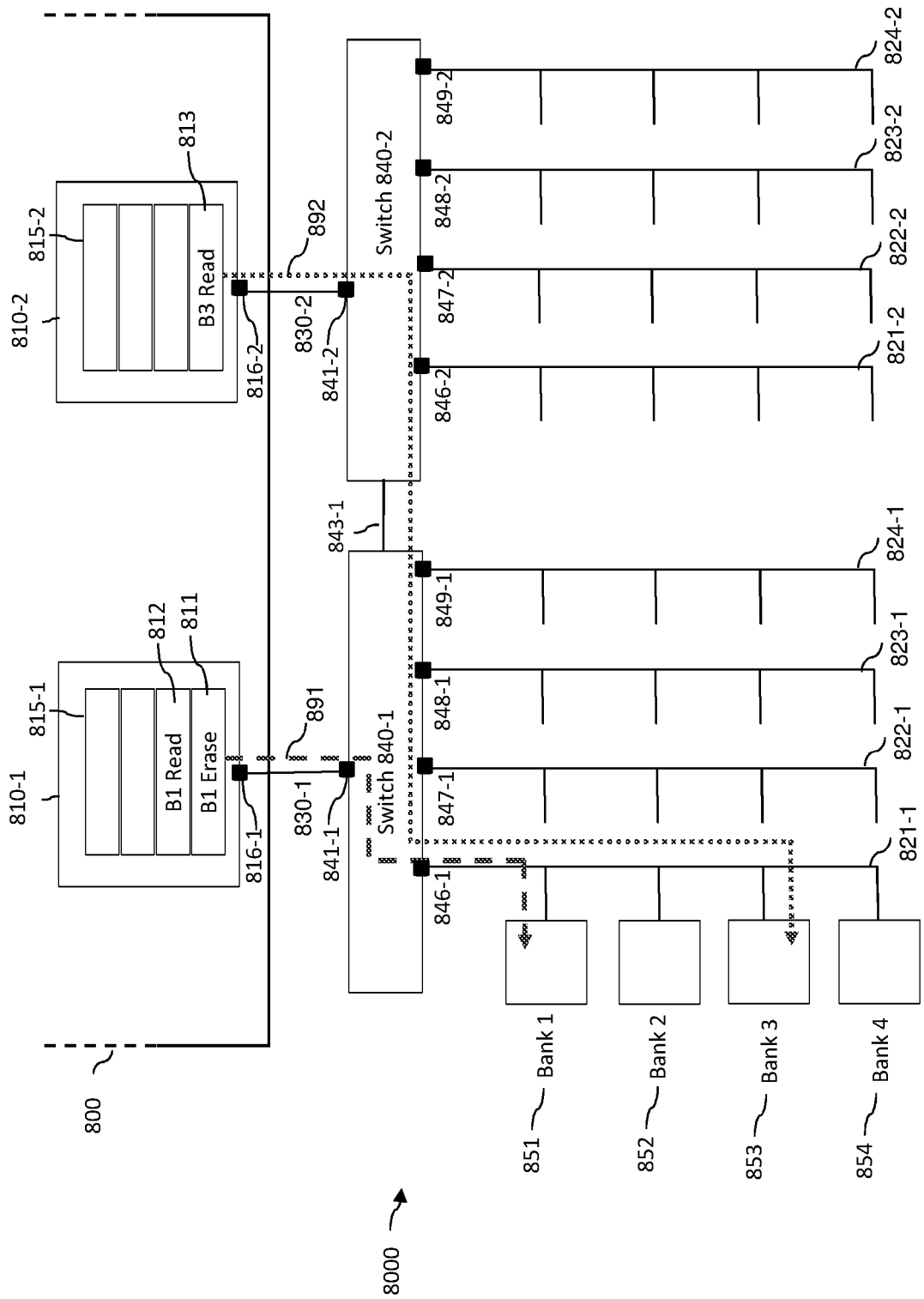
FIG. 8 is a block diagram illustrating another example operation of a memory system using a switched architecture according to some embodiments.

FIG. 8 is a block diagram illustrating another example operation of a memory system 8000 using a switched architecture according to some embodiments.

The memory system 8000 includes a memory controller 800 and two switches 840-1 and 840-2. In the memory controller 800, channel controllers 810-1 and 810-2 may be connected to the switches 840-1 and 840-2, respectively. Each channel controller (each of 810-1 and 810-2) may include a serial interface (each of 816-1 and 816-2) which has similar configuration to that of each serial interface 480-1 to 480-K in FIG. 4. The channel controller 810-1 may include a queue 815-1 which can store data or commands to be transmitted to the switch 840-1 in the order in which the data or commands are stored in the queue. Similarly, the channel controller 810-2 may include a queue 815-2 which can store data or commands to be transmitted to the switch 840-2 in the order in which the data or commands are stored in the queue.

Each switch (each of 840-1 and 840-2) may have similar configuration to that of the switch 440 or 460 in FIG. 4. The switch 840-1 may include a serial interface 841-1 which has similar configuration to that of the serial interfaces 444-1 to 444-K in FIG. 4, and include four memory ports 846-1 to 849-1 which have similar configuration to that of the memory ports 448-1 to 448-4 in FIG. 4. Similarly, the switch 840-2 may include a serial interface 841-2 and four memory ports 846-2 to 849-2. Each switch (each of 840-1 and 840-2) may include a switching device which has similar configuration to that of a non-blocking switch unit 446 in FIG. 4, and may be configured to perform a bridging function which can decode and translate a DAC protocol packet to any parallel or serial bus memory protocol. The serial interfaces 841-1 and 841-2 of the switches 840-1 and 840-2 may be connected to the serial interfaces 816-1 and 816-2 of the memory controller 800 via two serial buses 830-1 and 830-2, respectively. The memory ports 846-1 to 849-1 may be respectively connected to four parallel memory buses 821-1 to 824-1 on which a plurality of parallel memory bus-type memory devices arranged in Bank 1 (851), Bank 2 (852), Bank 3 (853), Bank 4 (854) can transfer data and commands, respectively. Similarly, the memory ports 846-2 to 849-2 of the switch 840-2 may be respectively connected to four parallel memory buses 821-2 to 824-2.

FIG. 8 shows a scenario similar to that illustrated in FIG. 2, in which there exist three commands B1 Erase 811 (to erase a memory block on Bank 1), B1 Read 812 (to read data in a memory page from Bank 1), and B3 Read 813 (to read data in a memory page from Bank 3) to be transmitted in this order. As shown in FIG. 8, the memory controller 800 may determine that B1 Erase 811 is a long running command and B1 Erase 811 and B1 Read 812 need to access the same memory bank, and store B1 Erase 811 and B1 Read 812 in the queue 815-1 in this order, and store B3 Read 813 in a different queue 815-2. As shown in the command flow scenario 891 in FIG. 8, B1 Erase 811 may then be transferred to the switch 840-1 via a single serial bus 830-1, and further transferred to a memory device in Bank 1 via a parallel memory bus 821-1. Now, as shown in the command flow scenario 892 in FIG. 8, without any delay due to a queued command blocking or stalling in a queue, B3 Read 813 may be transferred to the switch 840-2 via a single serial bus 830-2, and further transferred to the switch 840-1 via an interconnecting link 843-1 and then transferred to a memory device in Bank 3 via a parallel memory bus 821-1. While B1 Read 812 is necessarily delayed until B1 Erase 811 completes, as Bank 1 851 is busy until the B1 Erase command completes, with this configuration, B3 Read 813 need not wait until B1 Erase 811 completes, thereby avoiding a delay due to a long running command blocking or stalling in a queue (see FIG. 2).

In some embodiments, a memory system for storing and retrieving data (e.g., the memory system 7000 in FIG. 7 or the memory system 8000 in FIG. 8) may include a controller (e.g., the memory controller 700 or the memory controller 800), a first switch (e.g., the switch 740 in FIG. 7 or the switch 840-1 in FIG. 8), and a plurality of memory devices (e.g., memory devices arranged in Bank 1 to Bank 4 in FIG. 7 and FIG. 8). The controller may have a first serial interface (e.g., the serial interface 716-1 in FIG. 8 or the serial interface 816-1 in FIG. 8). The first switch (e.g., the switch 740 in FIG. 7) may have one or more serial interfaces (e.g., the serial interfaces 741 and 742 in FIG. 7) and one or more memory ports (e.g., the memory ports 746-749 in FIG. 7). The first serial interface (e.g., the serial interface 816-1) of the controller may be communicatively connected to a first serial interface (e.g., the serial interface 841-1 in FIG. 8) of the one or more serial interfaces of the first switch via a first serial bus (e.g., the serial bus 830-1 in FIG. 8). Each of the one or more memory ports of the first switch (e.g., the memory ports 846-1-849-1 in FIG. 8) may be communicatively connected to a subset of the plurality of memory devices via a memory bus (e.g., each of the memory bus 821-1 to the memory bus 824-1 in FIG. 8). The first switch may be configured to transfer data between the controller and the subsets of the plurality of memory devices via the one or more memory ports.

In some embodiments, the controller (e.g., the memory controller 700) may have a second serial interface (e.g., the serial interface 716-2). The second serial interface of the controller (e.g., the serial interface 716-2) may be communicatively connected to a second serial interface (e.g., the serial interface 742) of the one or more serial interfaces of the first switch (e.g., the switch 740) via a second serial bus (e.g., the serial bus 730-2). The first switch may be further configured to receive first data (e.g., R1 Erase 711) via one of the first serial interface or the second serial interface of the controller (e.g., the serial interface 716-2), determine a memory port (e.g., the memory port 746) among the one or more memory ports of the first switch, determine a memory device (e.g., a memory device in Bank 1 (751)) among the subset of the plurality of memory devices, and transfer data to the determined memory device via the memory bus (e.g., the memory bus 721) corresponding to the determined memory port.

In some embodiments, the memory system (e.g., the memory system 5000 in FIG. 5) may further include a second switch (e.g., the switch 540-3) having one or more serial interfaces and one or more memory ports. The controller may have a third serial interface (e.g., the serial interface 516-3) communicatively connected to a serial interface (e.g., the serial interface 545-3) of the one or more serial interfaces of the second switch (e.g., the switch 540-3) via a third serial bus (e.g., the serial bus 530-3). The second switch (e.g., the switch 540-3) may be connected to the first switch (e.g., the switch 540-2) via an interconnecting bus (e.g., the interconnecting bus 543-2). The second switch (e.g., the switch 540-3) may be configured to transfer data (e.g., CMD_b in FIG. 5) between the controller (e.g., the controller 500) and the subsets of the plurality of memory devices (e.g., Bank 2 (552) in FIG. 5) via the interconnecting bus (e.g., the interconnecting bus 543-2) and via the one or more memory ports of the second switch (e.g., the memory port 546).

In some embodiments, the first switch (e.g., the switch 440 in FIG. 4) may be configured to receive data packets (e.g., DAC packets in FIG. 3) into an input buffer (e.g., the I/O buffer 445-1 in FIG. 4) via the first serial interface (the serial interface 480-1 in FIG. 4) of the controller (e.g., the controller 400 in FIG. 4) according to a serial bus access protocol (e.g., the DAC protocol), decode the buffered data packets and determine a destination address (e.g., the destination DAC address 202 in FIG. 3) and a memory command (e.g., R3 Read 713 in FIG. 7) from the decoded data of each of the received data packets, determine a memory port among the one or more memory ports of the first switch (e.g., the memory ports 448-1 to 448-4 in FIG. 4) and the one or more memory ports of the second switch (e.g., the memory ports 468-1 to 468-4 in FIG. 4) based on the destination address, determine a memory device among the subset of the plurality of memory devices based on the destination address (e.g., the destination DAC address 202 in FIG. 3), and transfer the memory command to the determined memory device via the determined memory port.

In some embodiments, the first switch (e.g., the switch 440 in FIG. 4) may determine whether the destination address e.g., the destination DAC address 202 in FIG. 3) is a memory device on the first switch or a memory device on the second switch (the switch 460 in FIG. 4). In response to determination that the destination address is a memory device on the first switch, the first switch may determine a memory port among the one or more memory ports of the first switch (e.g., the memory ports 448-1 to 448-4 in FIG. 4) based on the destination address, determine a memory device on the first switch among the subset of the plurality of memory devices based on the destination address, decode the memory command, and transfer the memory command to the determined memory device via the determined memory port of the first switch. On the other hand, in response to determination that the destination address is a memory device on the second switch, the first switch may transfer the data packets to the second switch.

In some embodiments, the second switch (the switch 460 in FIG. 4) may receive the data packets into an input buffer of the second switch via the interconnecting bus (the second interconnecting bus 463 in FIG. 4) according to a serial bus access protocol. The second switch may decode the buffered data packets and determine a destination address and a memory command (e.g., R3 Read 713 in FIG. 7) from the decoded data of each of the received data packets. The second switch may determine a memory port among the one or more memory ports of the second switch (e.g., the memory ports 468-1 to 468-4 in FIG. 4) based on the destination address, determine a memory device on the switch among the subset of the plurality of memory devices based on the destination address, decode the memory command, and transfer the memory command to the determined memory device via the determined memory port of the second switch.

In some embodiments, the first switch may be further configured to determine memory bus data associated with the memory command (e.g., data associated with R3 Read 713 in FIG. 7) from the decoded data, and transfer the associated memory bus data to the determined memory device (e.g., a memory device in Bank 3 in FIG. 7) via the determined memory port.

In some embodiments, the memory bus may be a parallel bus (e.g., the parallel memory buses 520-1 to 520-N in FIG. 5). In some embodiments, the memory bus may be a serial bus (e.g., the serial memory buses 621-1 to 624-1 in FIG. 6).

Figure 9:
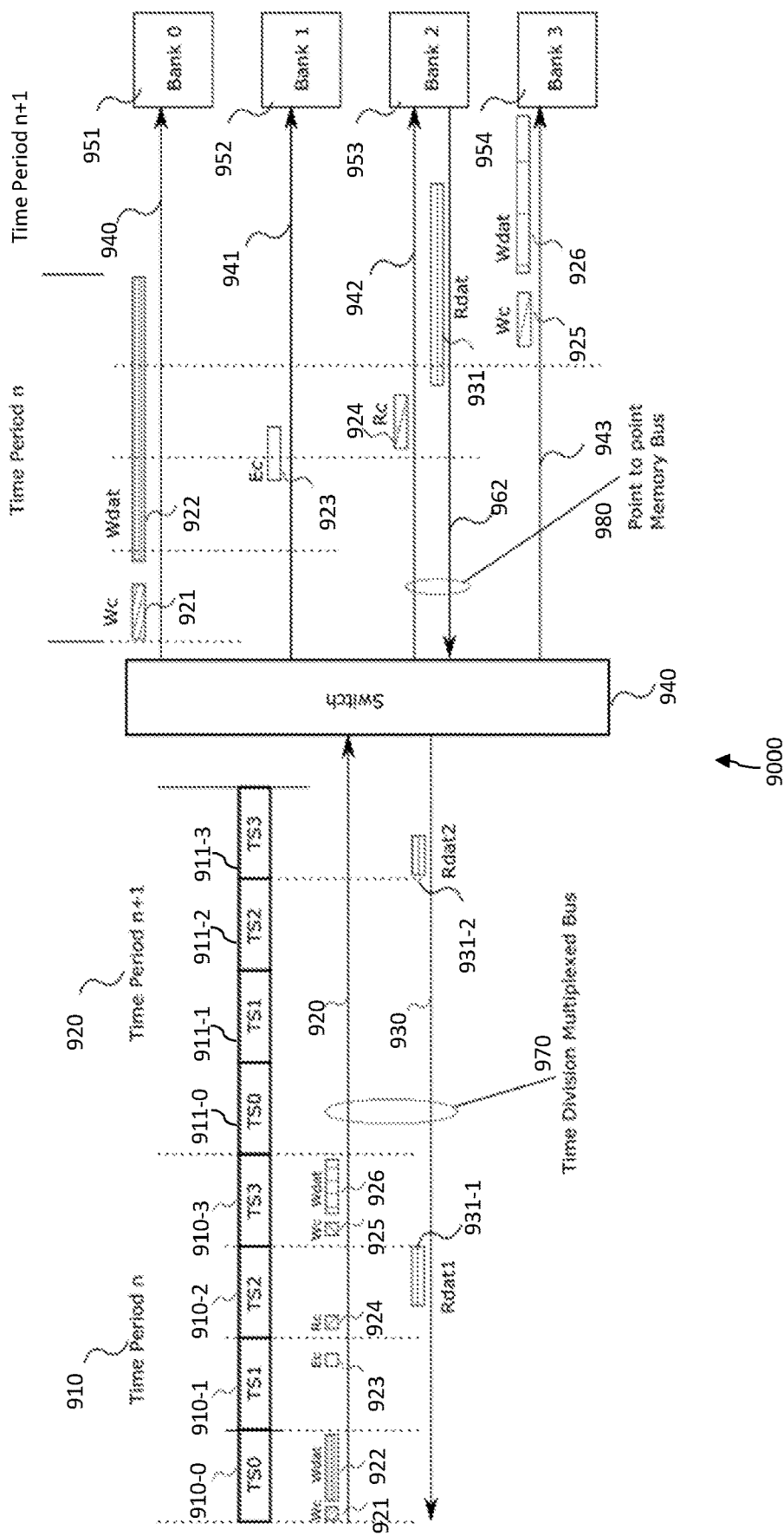
FIG. 9 is a block diagram illustrating an example memory system implementing a time division multiplex (TDM) scheme using a switched architecture according to some embodiments.
Figure 10:
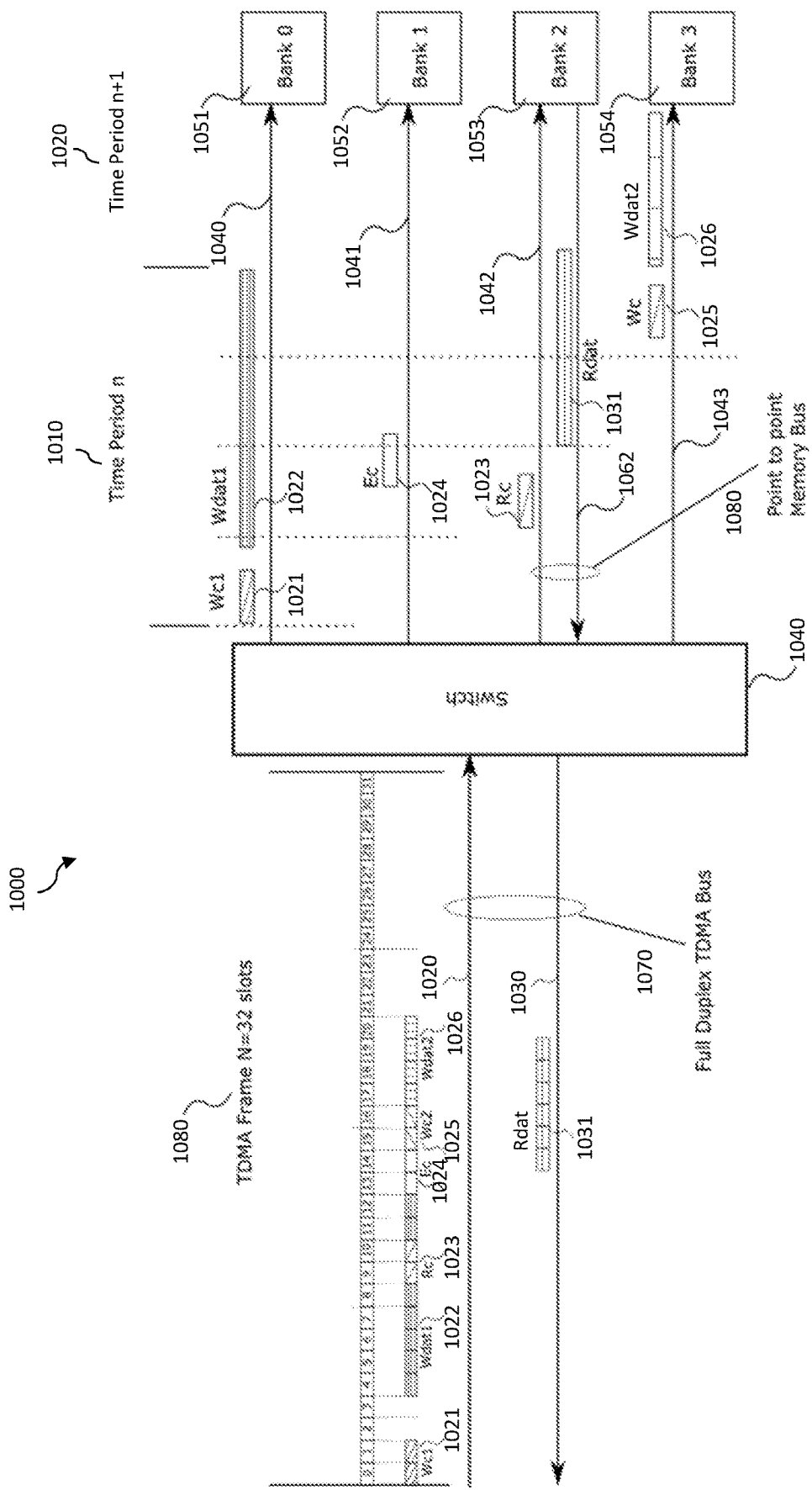
FIG. 10 is a block diagram illustrating an example memory system implementing another TDM scheme using a switched architecture according to some embodiments.

FIG. 9 is a block diagram illustrating an example memory system 9000 implementing a time division multiplex (TDM) scheme using a switched architecture according to some embodiments. In some embodiments, in the case of a serial bus connection to serial-bus type memory devices (see FIG. 6), the connection between the controller and a switch may be operated in a TDM mode, whereby timeslots can be defined for each destination bank, ensuring a dedicated full bandwidth of commands/data transfer to each bank. In some embodiments, timeslots can be defined to ensure a minimum quality of service (QoS) in terms of supported data rates, latencies and bandwidth availability for independent groups of commands and data transfers belonging to different IOD sets. FIG. 9 and FIG. 10 show two different TDM schemes according to some embodiments.

Referring to FIG. 9, the memory system 900 may include a memory controller (not shown) which has configuration similar to that of the memory controller 600 in FIG. 6, and a switch 940 which has configuration similar to that of the switch 640-1 in FIG. 6. The memory controller may be connected to the switch 940 via a time division multiplex (TDM) bus 970. In some embodiments, the TDM bus 970 may be a serial bus which has configuration similar to that of the serial bus 630-1 in FIG. 6 and supports a full duplex data transmission. Memory ports of the switch 940 may be respectively connected to four serial memory buses 980 on which memory devices in Banks 1-4 can transfer data or commands, respectively. In some embodiments, the serial memory buses 980 may have configuration similar to that of the serial memory buses 621-1-624-1 in FIG. 6.

The memory system 9000 may apply a TDM scheme in which timeslots are allocated for downstream devices. For example, as shown in FIG. 9, in time period n (910), four timeslots TS0 (910-0) to TS3 (910-3) may be allocated for memory devices in Bank 0 (951) to Bank 4 (954). Similarly, in time period n+1 (920), four timeslots TS0 (911-0) to TS3 (911-3) may be allocated for memory devices in Bank 0 (951) to Bank 4 (954).

In some embodiments, a full duplex data transmission may be performed between the controller and the switch so that transmission of commands or data from the controller to a memory device (e.g., downstream 920 from left to right in FIG. 9) and transmission of data or status returned from the memory device to the controller (e.g., upstream 930 from right to left in FIG. 9) can be performed simultaneously. Similarly, a full duplex data transmission may be performed between the switch and a memory device so that transmission of commands or data from the switch to the memory device (e.g., downstream 940, 941, 942, 943 from left to right in FIG. 9) and transmission of data or status returned from the memory device to the controller (i.e., upstream 962 from right to left in FIG. 9) can be performed simultaneously. In some embodiments, a half duplex data transmission may be performed between the controller and the switch or between the switch and the memory devices.

In some embodiments, in the TDM scheme, commands and data whose destination is a particular memory device can only be transmitted during a timeslot dedicated for that device. For example, as shown in FIG. 9, a command Wc (921) and data Wdat (922) whose destination is a memory device in Bank 0 can only be transmitted during the timeslot TS0 dedicated for Bank 0; a command Ec (923) whose destination is a memory device in Bank 1 can only be transmitted during the timeslot TS1 dedicated for Bank 1; a command Rc (924) whose destination is a memory device in Bank 2 can only be transmitted during the timeslot TS2 dedicated for Bank 2; and a command Wc (925) and data Wdat (926) whose destination is a memory device in Bank 3 can only be transmitted during the timeslot TS0 dedicated for Bank 3.

In some embodiments, if transmission time of commands or data exceeds the slot time (i.e., the duration of the timeslot), transmission of the commands or data may be continued in the next timeslot. For example, as shown in FIG. 9, because transmission of the command Wdat (922) does not complete in the timeslot TS0 (910-0), the transmission of the command Wdat (922) may be continued in the next timeslot TS1 (910-1) until it completes in the timeslot TS3 (910-3). In some embodiments, commands or data whose destination is a memory device may be buffered in the switch and then transmitted on to the memory device using the memory device's local bus, which may be a serial memory bus or a parallel memory bus.

In some embodiments, the signaling rate of transmission on the upstream side of the switch may be set higher than the downstream side such that the data transmitted during one timeslot upstream will occupy the whole time period on the downstream side to match the data sent during the time period. In some embodiments, the upstream rate may be set to four times (4×) the downstream rate, so that the amount of upstream data during a slot time can match the amount of downstream during the whole time period (e.g., time period n). Using this scheme, the amount of upstream data during a time period may be equivalent to the amount of four commands plus data in the downstream, which will get buffered then distributed to four individual device buses in the same time period. For example, referring to FIG. 9, the signaling rate of upstream data Rdat1 (931-1) and Rdat2 (931-2) may be set to four times the signaling rate of downstream data (e.g., the command Wc (921) and the data Wdat (922)).

An advantage of the TDM scheme as illustrated in FIG. 9 is that there is a fixed defined (or limited) bandwidth for each device on the TDM bus (e.g., the TDM bus 970 in FIG. 9), so bus activity to the other three devices does not affect the bus activity to a given device. A disadvantage is that a command may have to be queued by the controller for up to ¾ of the time period before it can begin transmission to the switch (during the timeslot TS3), thereby adding extra latency, even if there is no other bus activity to the other three devices.

In some embodiments, a TDM scheme according to some embodiments may be applied as follows. (1) Data packets (e.g., DAC packets in FIG. 3) received during the dedicated timeslot may be buffered. For example, data packets may be buffered in I/O buffers 445-1 to 445-K in FIG. 4. (2) The buffered data packets may be decoded. (3) A memory port may be determined based on a decoded destination address (e.g., destination DAC address 202 in FIG. 3). (4) the decoded memory command and any data associated thereof may be inserted into a memory-side buffer/queue. For example, decoded commands or data may be inserted into the memory-side queues 447-1 to 447-K in FIG. 4. (5) A command and data may be taken (de-queued) from a memory-side queue. (6) A destination memory device may be selected by a switch, and the command and data taken from the memory-side queue may be transferred to the destination memory device on a memory bus.

In a TDM scheme according to some embodiments, timeslots may be allocated (per controller, per port, or per device) in transmission via a serial bus between the controller and the switch, while no timeslots are allocated in transmission to a memory device via a memory bus. In other words, on the downstream side, the memory bus may be operated using chip select to select a memory device so that transfers to or from that memory device have exclusive use of the bus.

In some embodiments, the controller may be configured to allocate a dedicated timeslot (e.g., TS0 to TS3 in FIG. 9) per destination (e.g., per memory bank in FIG. 9) in a time period (e.g., the time period n in FIG. 9) and perform data transfer with the subsets of memory devices on each destination (e.g., Bank 0, Bank 1, Bank 2, Bank 4 in FIG. 9) during the corresponding timeslot in the time period. The destination may be one of memory port (e.g., memory ports 646-1-649-1 in FIG. 6) or memory device. In this case, the destination address within the data packet (e.g. DAC packets in FIG. 3) may be omitted as the timeslot occupied by the packet may alone determine the destination (e.g. TS0 to TS3 have fixed destinations Bank 0 to Bank3 respectively in FIG. 9).

In some embodiments, the controller may be configured to allocate timeslots based on a request and arbitration scheme, whereby requests to access one or more timeslots (e.g., TS0 to TS3 in FIG. 9) may be received by the controller from I/O queues within the controller and switch and access granted. In this way any data transfer to/from a memory bank may proceed on any timeslot, providing access to that timeslot has been granted by the controller.

In some embodiments, a first switch (e.g., the switch 440 in FIG. 4) may be configured to receive data packets (e.g., DAC packets in FIG. 3) into an input buffer (e.g., I/O buffer 445-1 in FIG. 4) via a first serial interface (e.g., the serial interface 480-1 in FIG. 4) of a controller (e.g., the memory controller 400 in FIG. 4) according to a serial bus access protocol (e.g., DAC protocol in FIG. 3), decode the buffered data packets, and determine a destination address (e.g., destination DAC address 202 in FIG. 3), a memory command and associated memory data from the decoded data of each of the received data packets. The first switch may be further configured to determine a memory device among the subset of the plurality of memory devices based on the destination address, insert the memory command and memory data from each of the decoded packets into a queue (e.g., the memory-side queue 447-1 in FIG. 4) for the destination corresponding to the dedicated timeslot (e.g., TS0 dedicated to Bank 1), and control a chip select of the determined memory device on the memory bus (e.g., the serial memory bus 621-1 to 624-1 in FIG. 6).

In some embodiments, the controller may be further configured to transfer data with multiple memory devices according to multiple input/output determinism (IOD) sets, and allocate separate timeslots to each of the multiple IOD sets, such that data according to different IOD sets are transferred without interference from each other using available memory ports. For example, FIG. 9 shows at least four IOD sets including (1) an IOD set having the command Wc (921) and data Wdat (922) to which the timeslot TS0 is allocated; (2) an IOD set having the command Ec (923) to which the timeslot TS1 is allocated; (3) an IOD set having the command Rc (924) to which the timeslot TS2 is allocated; and (4) an IOD set having the command Wc (925) and data Wdat (926) to which the timeslot TS3 is allocated.

In some embodiments, the controller may transfer data with the plurality of memory devices according to a time division multiple access (TDMA) protocol using a plurality of timeslots. In some embodiments, each timeslot is dedicated to transfer data to one of the plurality of memory devices such that data transfers to different memory devices are performed without interference from each other. Each time slot may be dedicated to transfer data to a corresponding memory device in a one-to-one correspondence. For example, FIG. 9 shows that the time slots TS0, TS1, TS2, and TS3 are allocated to corresponding memory devices in an one-to-one correspondence such that data transfers to different memory devices are performed without interference from each other. In some embodiments, more than one time slots may be dedicated to transfer data to one memory device such that data transfers to different memory devices are performed without interference from each other. For example, data transfers to the same memory device may use different time slots (dedicated to the same memory device) so that they are performed without interference from each other.

FIG. 10 is a block diagram illustrating an example memory system implementing another TDM scheme using a switched architecture according to some embodiments.

Referring to FIG. 10, the memory system 1000 may include a memory controller (not shown) which has configuration similar to that of the memory controller 600 in FIG. 6, and a switch 1040 which has configuration similar to that of the switch 640-1 in FIG. 6. The memory controller may be connected to the switch 1040 via a time division multiplex (TDM) bus 1070. In some embodiments, the TDM bus 1070 may be a serial bus which has configuration similar to that of the serial bus 630-1 in FIG. 6 and supports a full duplex data transmission. Memory ports of the switch 1040 may be respectively connected to four serial memory buses 1080 on which memory devices in Banks 1-4 can transfer data or commands, respectively. In some embodiments, the serial memory buses 1080 may have configuration similar to that of the serial memory buses 621-1-624-1 in FIG. 6.

The memory system 1000 may apply a TDM scheme in which timeslots are allocated for commands or data. For example, referring to FIG. 10, as indicated by a time division multiple access (TDMA) frame 1018, in time period n (1010), 32 timeslots (TS0 to TS31) may be allocated for commands or data whose destinations are memory devices in Bank 0 (1051) to Bank 4 (1054). For example, in time period n (1010), timeslots TS0-TS1, TS4-TS8 and TS11-TS12 (11 timeslots) are allocated for a command Wc1 (1021) and data Wdat1 (1022) to be transmitted to Bank 0; timeslots TS9-TS10 (2 timeslots) are allocated for a command Rc (1023) to be transmitted to Bank 3; timeslots TS13-TS14 (2 timeslots) are allocated for a command Ec (1024) to be transmitted to Bank 1; and timeslots TS15-TS20 (6 timeslots) are allocated for a command Wc2 (1025) and data Wdat2 (1026) to be transmitted to Bank 3. Similar timeslot allocation can be performed for time period n+1 (1020).

In some embodiments, a full duplex data transmission may be performed between the controller and the switch so that transmission of commands or data from the controller to a memory device (e.g., downstream 1020 from left to right in FIG. 10) and transmission of data or status returned from the memory device to the controller (e.g., upstream 1030 from right to left in FIG. 10) can be performed simultaneously. For example, referring to FIG. 10, upstream transmission of upstream data Rdat (1031) and downstream transmission of the command Ec (1024), the command Wc2 (1025) and the data Wdat2 (1026) may be performed simultaneously between the controller and the switch. Similarly, a full duplex data transmission may be performed between the switch and a memory device so that transmission of commands or data from the switch to the memory device (e.g., downstream 1040, 1041, 1042, 1043 from left to right in FIG. 10) and transmission of data or status returned from the memory device to the controller (i.e., upstream 1062 from right to left in FIG. 10) can be performed simultaneously. In some embodiments, a half duplex data transmission may be performed between the controller and the switch or between the switch and the memory devices.

Compared to the TDM scheme in FIG. 9 in which a predetermined time slot allocation is repeatedly, in the TDM scheme illustrated in FIG. 10, access to the timeslots can be arbitrated or allocated according to some agreed scheme, for example, first come first served (FCFS) or a round robin scheme or a prioritized scheme or a fair share scheme or a scheme based on trade between devices. In some embodiments, a prioritized scheme may be defined such that access to four devices (devices 1 to 4) could be in some order of hierarchy, e.g., 1,2,3/4, which means the device 1 taking precedence over the device 2 taking precedence over the devices 3 and 4 which are equal precedence. In some embodiments, a priority may be defined or determined based on characteristics of commands or data, for example a minimum or maximum allowed latency of execution or completion for particular commands, such as read commands or write (program) commands. For example, in FIG. 10, the read command Rc (1023) may have precedence or priority over the erase command Ec (1025) so that timeslots allocated for the read command Rc (1023) precedes the timeslots allocated for the erase command Ec (1025). In some embodiments, a fair share scheme may be defined such that access for each device is guaranteed up to 8 timeslots in a time period. In applying these timeslot allocation schemes, at least one of the memory controller, switch, and memory buses may be able to (1) identify source/destination addresses of received packets and (2) route the packets on the bus (e.g., the TDM bus 1070 or the memory buses 1080 in FIG. 10) based on access priority according to the applied timeslot allocation scheme. In other words, instead of using a predetermined time slot allocation scheme repeatedly (as shown in FIG. 9), timeslots can be allocated for destination dynamically according to an agreed timeslot allocation scheme (e.g., FCFS, a prioritized scheme, or a fair share scheme or a trade based scheme). With this configuration, the potential for latencies introduced for access to the TDM bus can be reduced, while still being capable of insulating (to varying degrees, depending on the access scheme) activity to particular devices from the activity to other devices. For example, as shown in FIG. 10, the read command Rc can fit in the middle of a data transfer and have priority over the erase command Ec, thereby reducing latency in the read operation.

In some embodiments, the memory system may have a configuration in which the bus is asynchronous. In other words, in this configuration, it is possible that packets transfers are not synchronous to a fixed timeslot scheme, so that the packets can freely occur at any time. This configuration may apply a media access/arbitration scheme that enables fair access to all devices and prevents 'hogging' of the bus. In some embodiments, a hybrid scheme of FIG. 9 may be applied in which packets can be transferred freely within the allocated timeslot, which may need to cleanly cut a packet at the end of a timeslot and resume it at the beginning of the next allocated timeslot.

Figure 11:
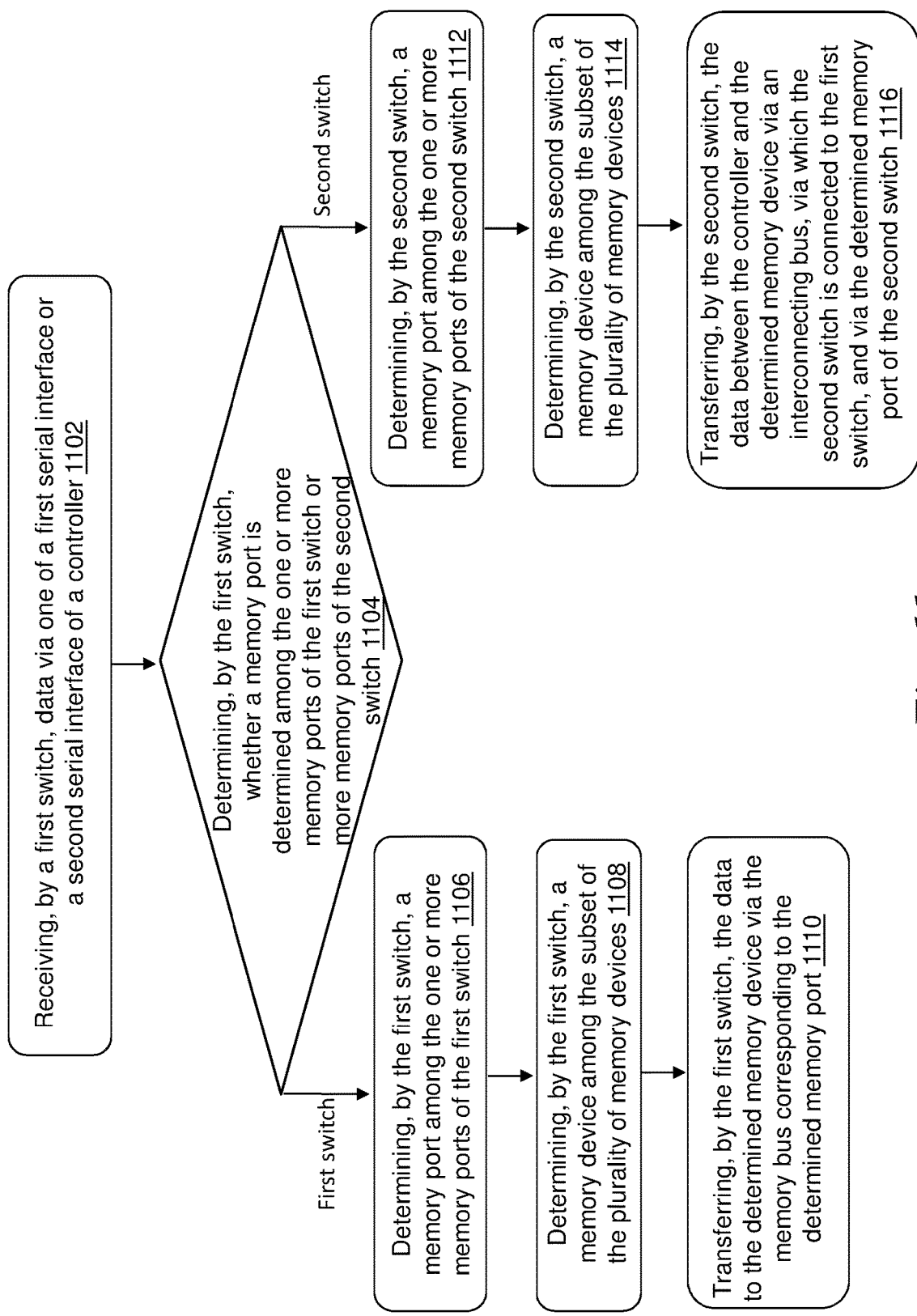
FIG. 11 is a flowchart illustrating an example methodology for storing and retrieving data in a memory system using a switched architecture according to some embodiments.

FIG. 11 is a flowchart illustrating an example methodology for storing and retrieving data in a memory system using a switched architecture according to some embodiments. In some embodiments, the memory system (e.g., the memory system 7000 in FIG. 7 or the memory system 8000 in FIG. 8) may include a plurality of memory devices (e.g., memory devices arranged in Bank 1 to Bank 4 in FIG. 7 and FIG. 8), a controller (e.g., the memory controller 700 or the memory controller 800), a first switch (e.g., the switch 740 in FIG. 7 or the switch 840-1 in FIG. 8), and a second switch (e.g., the switch 540-3). The controller may have one or more serial interfaces (e.g., the serial interfaces 480-1-480-K and 482-1-482-M in FIG. 4). Each of the first switch and the second switch may have one or more serial interfaces and one or more memory ports. A first serial interface (e.g., the serial interface 816-1 in FIG. 8) of the one or more serial interfaces of the controller may be communicatively connected to a first serial interface (e.g., the serial interface 841-1 in FIG. 8) of the one or more serial interfaces of the first switch via a first serial bus (the serial interface 816-1 in FIG. 8). Each of the one or more memory ports of the first switch (e.g., the memory ports 846-1-849-1 in FIG. 8) may be communicatively connected to a subset of the plurality of memory devices via a memory bus (e.g., each of the memory bus 821-1 to the memory bus 824-1 in FIG. 8). In some embodiments, the memory bus may be a parallel bus (e.g., the parallel memory buses 520-1 to 520-N in FIG. 5). In some embodiments, the memory bus may be a serial bus (e.g., the serial memory buses 621-1 to 624-1 in FIG. 6). A second serial interface (e.g., the serial interface 716-2) of one or more serial interfaces of the controller may be communicatively connected to a second serial interface (the serial interface 742) of one or more serial interfaces of the first switch (e.g., the switch 740) via a second serial bus (e.g., the serial bus 730-2). A third serial interface (e.g., the serial interface 516-3 in FIG. 5) of the one or more serial interfaces of the controller may be communicatively connected to a serial interface (e.g., the serial interface 545-3) of the one or more serial interfaces of the second switch (e.g., the switch 540-3) via a third serial bus (e.g., the serial bus 530-3). The second switch (e.g., the switch 540-3) may be connected to the first switch (e.g., the switch 540-2) via an interconnecting bus (e.g., the interconnecting bus 543-2).

In this example methodology, the process begins in block S1102 by receiving, by the first switch (e.g., the switch 840-1 in FIG. 8), data (e.g., R1 Erase 811 in FIG. 8) via one of a first serial interface (e.g., the serial interface 816-1) or a second serial interface (e.g., other serial interfaces shown in FIG. 4) of the controller (e.g., the memory controller 800) to determine a memory port among one or more memory ports of the first switch (e.g., the switch 840-1 in FIG. 8) and one or more memory ports of the second switch (e.g., the switch 840-2 in FIG. 8).

In block S1104, it may be determined by the first switch whether a memory port is determined among the one or more memory ports of the first switch or more memory ports of the second switch. The data may be data packets (e.g., DAC packets in FIG. 3) received by the first switch via the first serial interface (e.g., the serial interface 816-1) of the controller according to a serial bus access protocol (e.g., the DAC protocol). The received data packets may be decoded by the first switch. In some embodiments, the switch may use a bridging function which can decode a DAC protocol packet to any parallel or serial bus memory protocol. A destination address (e.g., the destination DAC address 202 in FIG. 3) and a memory command (e.g., R3 Read 713 in FIG. 7) may be determined by the first switch from the decoded data of each of the received data packets. Memory bus data associated with the memory command (e.g., data associated with R3 Read 713 in FIG. 7) may be determined by the first switch from the decoded data.

In block S1106, when the first switch is determined, a memory port (e.g., the memory port 746 in FIG. 7) may be determined, by the first switch, among the one or more memory ports of the first switch (e.g., the memory ports 746 to 749 in FIG. 7). In some embodiments, a memory port may be determined by the first switch among the one or more memory ports of the first switch based on the destination address (e.g., the destination DAC address 202 in FIG. 3) determined from the decoded data of each of the received data packets.

In block S1108, a memory device (e.g., a memory device in Bank 1 (751) in FIG. 7) may be determined, by the first switch, among a subset of a plurality of memory devices (e.g., memory devices in Bank 1 (751) in FIG. 7). In some embodiments, a memory device may be determined by the first switch among the subset of the plurality of memory devices based on the destination address (e.g., the destination DAC address 202 in FIG. 3) determined from the decoded data of each of the received data packets.

In block S1110, the data may be transferred, by the first switch, to the determined memory device via a memory bus (e.g., the parallel memory bus 721 in FIG. 7) corresponding to the determined memory port (e.g., the memory port 746 in FIG. 7). In some embodiments, the memory command may be transferred by the first switch to the determined memory device (e.g., a memory device in Bank 1 (751) in FIG. 7) via the determined memory port of the first switch (e.g., the memory port 746 in FIG. 7). In some embodiments, the associated memory bus data (e.g., data associated with R3 Read 713 in FIG. 7) may be transferred by the first switch to the determined memory device via the determined memory port of the first switch.

In block S1112, when the second switch is determined, a memory port may be determined, by the second switch, among the one or more memory ports of the second switch (e.g., the memory ports 468-1 to 468-4 in FIG. 4). In some embodiments, a memory port may be determined by the first switch among the one or more memory ports of the second switch based on the destination address (e.g., the destination DAC address 202 in FIG. 3) determined from the decoded data of each of the received data packets.

In block S1114, a memory device may be determined, by the second switch, among a subset of a plurality of memory devices. In some embodiments, a memory device may be determined by the first switch (e.g., the switch 540-2 in FIG. 5) among the subset of the plurality of memory devices (e.g., memory devices connected to the parallel memory bus 520-3 in FIG. 5) based on the destination address determined from the decoded data of each of the received data packets.

In block S1116, the data (e.g., CMD_b in FIG. 5) may be transferred, by the second switch (e.g., the switch 540-3), between the controller (e.g., the memory controller 500 in FIG. 5) and the determined memory device via an interconnecting bus (e.g., the interconnecting bus 543-2 in FIG. 5), via which the second switch (e.g., the switch 540-3) is connected to the first switch (e.g., the switch 540-2), and via the determined memory port (e.g., the memory port 546-3) of the second switch. In some embodiments, the memory command (e.g., CMD_b in FIG. 5) may be transferred by the second switch to the determined memory device via the interconnecting bus and via the determined memory port of the second switch. In some embodiments, In some embodiments, the associated memory bus data (e.g., memory bus data associated with CMD_b in FIG. 5) may be transferred by the second switch to the determined memory device via the interconnecting bus and via the determined memory port of the second switch.

Figure 12:
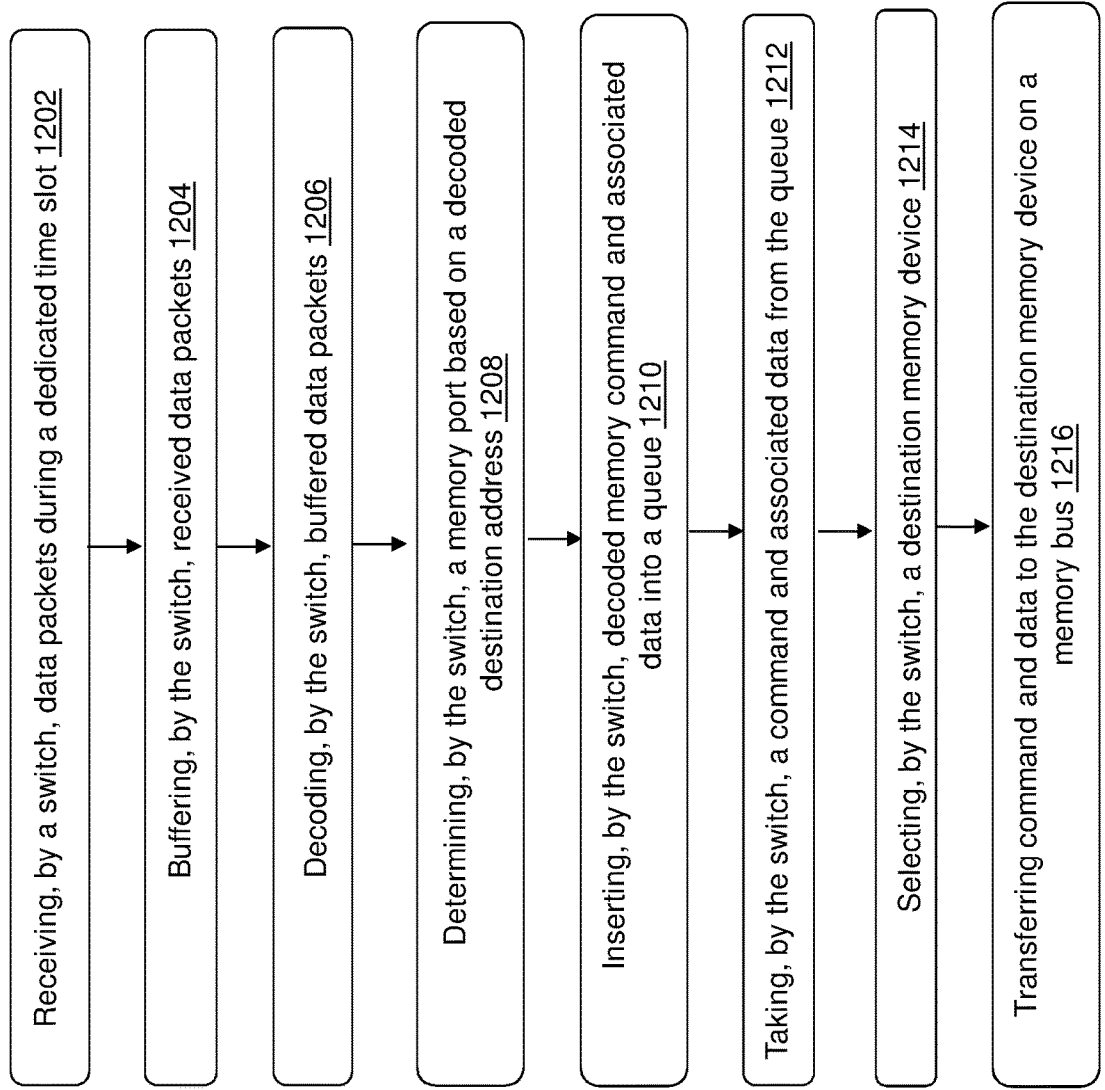
FIG. 12 is a flowchart illustrating another example methodology for storing and retrieving data in a memory system using a switched architecture according to some embodiments.

FIG. 12 is a flowchart illustrating another example methodology for storing and retrieving data in a memory system using a switched architecture according to some embodiments.

In this example methodology, the process begins in block S1202 by receiving, by a switch (e.g., the switch 940 in FIG. 9 or the switch 440 in FIG. 4), data packets (e.g., DAC packets in FIG. 3) during a dedicated time slot (e.g., TS0 to TS3 in FIG. 9). Data packets may be received by the switch into an input buffer (e.g., the I/O buffer 445-1 in FIG. 4) via a first serial interface (the serial interface 480-1 in FIG. 4) of a controller (e.g., the controller 400 in FIG. 4) according to a serial bus access protocol (e.g., the DAC protocol). A dedicated timeslot (e.g., TS0 to TS3 in FIG. 9) per destination (e.g., per memory bank in FIG. 9) may be allocated by the controller in a time period (e.g., the time period n in FIG. 9) and data transfer with subsets of memory devices may be performed on each destination (e.g., Bank 0, Bank 1, Bank 2, Bank 4 in FIG. 9) during the corresponding timeslot in the time period. The destination may be one of memory port (e.g., memory ports 646-1-649-1 in FIG. 6) or memory device.

In block S1204, the received data packets may be buffered by the switch. For example, data packets may be buffered in I/O buffers 445-1 to 445-K in FIG. 4.

In block S1206, the buffered data packets may be decoded by the switch. The switch may use a bridging function which can decode a DAC protocol packet to any parallel or serial bus memory protocol. A destination address (e.g., destination DAC address 202 in FIG. 3), a memory command and associated memory data may be determined from the decoded data of each of the received data packets.

In block S1208, a memory port may be determined by the switch based on a decoded destination address (e.g., destination DAC address 202 in FIG. 3).

In block S1210, the decoded memory command and any data associated thereof may be inserted by the switch into a queue (e.g., the memory-side queue 447-1 in FIG. 4) for the destination (e.g., one of Bank 0, Bank 1, Bank 2, Bank 4 in FIG. 9) corresponding to the dedicated timeslot. For example, decoded commands or data may be inserted into the memory-side queues 447-1 to 447-K in FIG. 4.

In block S1212, the commands and data may be taken (de-queued) from the queue (e.g., the memory-side queue 447-1 in FIG. 4) by the switch.

In block S1214, a destination memory device may be selected by the switch. A destination memory device may be determined by the first switch among the subset of the plurality of memory devices (e.g., Bank 0 to Bank 1 in FIG. 10) based on the destination address (e.g., destination DAC address 202 in FIG. 3). The switch may use a bridging function which can translate a DAC protocol packet to any parallel or serial bus memory protocol. A chip select of the determined memory device may be controlled by the first switch on a memory bus (e.g., the serial memory bus 621-1 to 624-1 in FIG. 6).

In block S1216, the command and data taken from the queue (e.g., the memory-side queue 448-1 in FIG. 4) may be transferred by the switch to the destination memory device on a memory bus. In some embodiments, data may be transferred by the controller with multiple memory devices according to multiple input/output determinism (IOD) sets. Separate timeslots may be allocated by the controllers to each of the multiple IOD sets such that data according to different IOD sets are transferred without interference from each other using available memory ports. For example, FIG. 9 shows at least four IOD sets including (1) an IOD set of the command Wc (921) and data Wdat (922) to which the timeslot TS0 is allocated; (2) an IOD set of the command Ec (923) to which the timeslot TS1 is allocated; (3) an IOD set of the command Rc (924) to which the timeslot TS2 is allocated; and (4) an IOD set of the command Wc (925) and data Wdat (926) to which the timeslot TS3 is allocated.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated by one of skill in the art the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A memory system for storing and retrieving data, comprising:
   a controller having a first serial interface;
   a first switch having one or more serial interfaces and one or more memory ports; and
   a plurality of memory devices, wherein the first serial interface of the controller is communicatively connected to a first serial interface of the one or more serial interfaces of the first switch via a first serial bus, wherein each of the one or more memory ports of the first switch is communicatively connected to a corresponding subset of a plurality of subsets of the plurality of memory devices via a corresponding memory bus, and wherein the first switch is configured to transfer data between the controller and the subsets of the plurality of memory devices via the one or more memory ports, and wherein the one or more memory ports comprise memory interfaces that are different from the one or more serial interfaces.

2. The memory system of claim 1, wherein the controller has a second serial interface, wherein the second serial interface of the controller is communicatively connected to a second serial interface of the one or more serial interfaces of the first switch via a second serial bus, wherein the first switch is further configured to:
  receive first data via one of the first serial interface or the second serial interface of the controller;
  determine a memory port among the one or more memory ports of the first switch;
  determine a memory device among the subset of the plurality of memory devices; and
  transfer data to the determined memory device via the memory bus corresponding to the determined memory port.

3. The memory system of claim 1, further comprising:

a second switch having one or more serial interfaces and one or more memory ports, wherein the controller has a third serial interface communicatively connected to a serial interface of the one or more serial interfaces of the second switch via a third serial bus, wherein the second switch is connected to the first switch via an interconnecting bus, wherein the second switch is configured to transfer data between the controller and the plurality of subsets of the plurality of memory devices via the interconnecting bus and via the one or more memory ports of the second switch.

4. The memory system of claim 3, wherein the first switch is configured to:
  receive data packets into an input buffer via the first serial interface of the controller according to a serial bus access protocol;
  decode the buffered data packets into decoded data and determine a destination address and a memory command from the decoded data of each of the received data packets;
  determine whether the destination address is a memory device on the first switch or a memory device on the second switch;
  in response to determination that the destination address is a memory device on the first switch:
    determine a memory port among the one or more memory ports of the first switch based on the destination address,
    determine a memory device on the first switch among the subset of the plurality of memory devices based on the destination address,
    decode the memory command, and
    transfer the memory command to the determined memory device via the determined memory port of the first switch; and
  in response to determination that the destination address is a memory device on the second switch, transfer the data packets to the second switch, and wherein the second switch is configured to:
  receive the data packets into an input buffer of the second switch via the interconnecting bus according to a serial bus access protocol;
  decode the buffered data packets and determine a destination address and a memory command from the decoded data of each of the received data packets;
  determine a memory port among the one or more memory ports of the second switch based on the destination address;
  determine a memory device on the switch among the subset of the plurality of memory devices based on the destination address;
  decode the memory command; and
  transfer the memory command to the determined memory device via the determined memory port of the second switch.

5. The memory system of claim 4, wherein the first switch is further configured to:
  determine memory bus data associated with the memory command from the decoded data; and
  transfer the associated memory bus data to the determined memory device via the determined memory port.

6. The memory system of claim 1, wherein the memory bus is a parallel bus.

7. The memory system of claim 1, wherein the memory bus is a serial bus.

8. The memory system of claim 7, wherein the controller is further configured to transfer data with the plurality of memory devices according to a time division multiple access (TDMA) protocol using a plurality of timeslots, and wherein each timeslot is dedicated to transfer data to one of the plurality of memory devices such that data transfers to different memory devices are performed without interference from each other.

9. The memory system of claim 1, wherein the controller is configured to allocate a dedicated timeslot per destination in a time period and perform data transfer with the plurality of subsets of memory devices on each destination during the corresponding timeslot in the time period, said destination being one of memory port or memory device.

10. The memory system of claim 9, wherein the first switch is configured to:
  receive data packets into an input buffer via the first serial interface of the controller according to a serial bus access protocol;
  decode the buffered data packets into decoded data and determine a destination address, a memory command and associated memory data from the decoded data of each of the received data packets;
  determine a memory device among the subset of the plurality of memory devices based on the destination address;
  insert the memory command and memory data from each of the decoded packets into a queue for the destination corresponding to the dedicated timeslot, and
  control a chip select of the determined memory device on the memory bus.

11. A method for storing and retrieving data in a memory system that includes a plurality of memory devices, a controller having one or more serial interfaces, and a first switch and a second switch, each switch having one or more serial interfaces and one or more memory ports, a first serial interface of the one or more serial interfaces of the controller being communicatively connected to a first serial interface of the one or more serial interfaces of the first switch via a first serial bus, each of the one or more memory ports of the first switch being communicatively connected to a corresponding subset of a plurality of subsets the plurality of memory devices via a corresponding memory bus, and wherein the one or more memory ports comprise memory interfaces that are different from the one or more serial interfaces the method comprising:
   determining a memory port among the one or more memory ports of the first switch and the one or more memory ports of the second switch; and
   transferring data between the controller and the corresponding subset of the plurality of subsets of the plurality of memory devices via the determined memory port.

12. The method of claim 11,
   wherein a second serial interface of the one or more serial interfaces of the controller is communicatively connected to a second serial interface of the one or more serial interfaces of the first switch via a second serial bus,
   wherein determining the memory port includes
      receiving, by the first switch, the data via one of the first serial interface or the second serial interface of the controller,
      determining, by the first switch, the memory port among the one or more memory ports of the first switch, and
      determining, by the first switch, a memory device among the subset of the plurality of memory devices, and
   wherein transferring the data includes
      transferring, by the first switch, the data to the determined memory device via the memory bus corresponding to the determined memory port.

13. The method of claim 11,
   wherein a third serial interface of the one or more serial interfaces of the controller is communicatively connected to a serial interface of the one or more serial interfaces of the second switch via a third serial bus,
   wherein the second switch is connected to the first switch via an interconnecting bus,
   wherein the method further comprises:
      transferring, by the second switch, data between the controller and the plurality of subsets of the plurality of memory devices via the interconnecting bus and via the one or more memory ports of the second switch.

14. The method of claim 13, further comprising:
   receiving, by the first switch, data packets via the first serial interface of the controller according to a serial bus access protocol;
   decoding, by the first switch, the received data packets into decoded data;
   determining, by the first switch, a destination address and a memory command from the decoded data of each of the received data packets;
   determining whether the destination address is a memory device on the first switch or a memory device on the second switch;

in response to determination that the destination address is a memory device on the first switch:
      determining, by the first switch, the memory port among the one or more memory ports of the first switch based on the destination address,
      determining, by the first switch, a memory device on the first switch among the subset of the plurality of memory devices based on the destination address,
      decoding the memory command, and
      transferring, by the first switch, the memory command to the determined memory device via the determined memory port of the first switch; and
   in response to determination that the destination address is a memory device on the second switch:
      receiving, by the second switch, data packets via the interconnecting bus according to a serial bus access protocol,
      decoding, by the second switch, the received data packets,
      determining, by the second switch, a destination address and a memory command from the decoded data of each of the received data packets,
      determining, by the second switch, a memory port among the one or more memory ports of the second switch based on the destination address,
      determining, by the first switch, a memory device among the subset of the plurality of memory devices based on the destination address,
      decoding the memory command, and
      transferring, by the first switch, the memory command to the determined memory device via the determined memory port of the second switch.

15. The method of claim 14, further comprising:
   determining, by the first switch, memory bus data associated with the memory command from the decoded data; and
   transferring, by the first switch, the associated memory bus data to the determined memory device via the determined memory port.

16. The method of claim 11, wherein the memory bus is a parallel bus.

17. The method of claim 11, wherein the memory bus is a serial bus.

18. The method of claim 17, further comprising:
   transferring, by the controller, data with the plurality of memory devices according to a time division multiple access (TDMA) protocol using a plurality of timeslots, wherein each timeslot is dedicated to transfer data to one of the plurality of memory devices such that data transfers to different memory devices are performed without interference from each other.

19. The method of claim 11, further comprising:
   allocating, by the controller, a dedicated timeslot per destination in a time period and performing data transfer with the plurality of subsets of memory devices on each destination during the corresponding timeslot in the time period, said destination being one of memory port or memory device.

20. The method of claim 19, further comprising:
   receiving, by the first switch, data packets into an input buffer via the first serial interface of the controller according to a serial bus access protocol;
   decoding, by the first switch, the buffered data packets into decoded data and determining a destination address, a memory command and associated memory data from the decoded data of each of the received data packets;

determining, by the first switch, a memory device among the subset of the plurality of memory devices based on the destination address;

inserting, by the first switch, the memory command and memory data from each of the decoded packets into a queue for the destination corresponding to the dedicated timeslot, and controlling, by the first switch, a chip select of the determined memory device on the memory bus.

* * * * *